US006554252B2

(12) United States Patent
Kazerooni et al.

(10) Patent No.: US 6,554,252 B2
(45) Date of Patent: Apr. 29, 2003

(54) DEVICE AND METHOD FOR WIRELESS LIFTING ASSIST DEVICES

(75) Inventors: Homayoon Kazerooni, 2806 Ashby Ave., Berkeley, CA (US) 94705; Dylan Miller Fairbanks, Crockett, CA (US); Albert Chen, Columbia, MD (US); Gene Shin, Santa Clara, CA (US)

(73) Assignee: Homayoon Kazerooni, Berkeley, CA (US)

( * ) Notice: Subject to any disclaimer, the term of this patent is extended or adjusted under 35 U.S.C. 154(b) by 0 days.

(21) Appl. No.: 10/098,045

(22) Filed: Mar. 15, 2002

(65) Prior Publication Data

US 2003/0057408 A1 Mar. 27, 2003

Related U.S. Application Data

(60) Provisional application No. 60/325,586, filed on Sep. 28, 2001.

(51) Int. Cl.[7] .................................................. B66D 1/00
(52) U.S. Cl. ..................... 254/270; 212/331; 254/266; 414/5
(58) Field of Search ................................. 254/266, 270; 212/330, 331, 338, 270, 271; 414/2, 4, 5

(56) References Cited

U.S. PATENT DOCUMENTS

| 2,940,608 A | 6/1960 | Underwood |
| 3,384,350 A | 5/1968 | Powell |
| 3,921,959 A | 11/1975 | Ulbing |
| 3,940,110 A | 2/1976 | Motoda |
| 4,055,905 A | 11/1977 | Budrose |
| 4,167,792 A | * 9/1979 | Carnegie ........................ 414/2 |
| 4,414,537 A | 11/1983 | Grimes |
| 4,444,205 A | 4/1984 | Jackson |
| 4,488,726 A | 12/1984 | Murray |

(List continued on next page.)

OTHER PUBLICATIONS

U.S. patent application Ser. No. 09/443,278, Kazerooni.
"A Case Study on Dynamics of Haptic Devices: Human Induced Instability in Powered Hand Controllers" Tanyia Snyder and H. Kazerooni, AIAA Journal of Guidance, Control and Dynamics, vol. 18, No. 1, 1995, pp 108–113.
"Human Power Extnder", H. Kazerooni, J, Guo, ASME Journal of Dynamic Systems, Measurements and Control, vol. 115, No. 2(B), Jun. 1993, pp 281–289.

*Primary Examiner*—Thomas J. Brahan

(57) ABSTRACT

A wireless lifting assist device includes a pulley driven by an actuator which is attached to a ceiling. An end-effector is suspended, via a line, from the pulley and interfaces the object to be maneuvered. The wireless lifting assist device further provides an instrumented glove worn by an operator. The glove measures the contact force the operator is exerting on either the object to be moved or the lifting assist device and generates a set of contact signals representing the contact force. The contact signals are transmitted to a controller. The controller generates a set of command signals to control the actuator as a function of the operator contact force such that a predetermined percentage of the force necessary to lift or lower the load is applied by the actuator, with the remaining force being supplied by the operator. The object thus feels lighter to the operator.

41 Claims, 19 Drawing Sheets

U.S. PATENT DOCUMENTS

| | | |
|---|---|---|
| 4,542,291 A | 9/1985 | Zimmerman |
| 4,557,659 A | 12/1985 | Scaglia |
| 4,575,297 A * | 3/1986 | Richter .......................... 414/5 |
| 4,613,139 A | 9/1986 | Robinson |
| 4,715,235 A | 12/1987 | Fukui |
| 4,917,360 A | 4/1990 | Kojima |
| 4,986,280 A | 1/1991 | Marcus et al. |
| 5,047,952 A | 9/1991 | Kramer et al. |
| 5,143,505 A | 9/1992 | Burdea et al. |
| 5,184,319 A | 2/1993 | Kramer |
| 5,316,017 A | 5/1994 | Edwards et al. |
| 5,358,219 A | 10/1994 | Shenk et al. |
| 5,449,002 A | 9/1995 | Goldman |
| 5,480,125 A | 1/1996 | Bitsh et al. |
| 5,551,308 A | 9/1996 | Arai et al. |
| 5,581,484 A | 12/1996 | Prince |
| 5,662,123 A | 9/1997 | Goldman |
| 5,669,809 A | 9/1997 | Townsend |
| 5,681,993 A | 10/1997 | Heitman |
| 5,723,786 A | 3/1998 | Klapman |
| 5,775,332 A | 7/1998 | Goldman |
| 5,796,354 A | 8/1998 | Cartabiano et al. |
| 5,850,928 A | 12/1998 | Kahlman et al. |
| 5,865,426 A | 2/1999 | Kazerooni |
| 5,915,673 A | 6/1999 | Kazerooni |
| 6,016,103 A | 1/2000 | Leavitt |
| 6,032,530 A | 3/2000 | Hock |
| 6,033,370 A | 3/2000 | Reinbold et al. |
| 6,035,274 A | 3/2000 | Kramer et al. |
| 6,126,572 A | 10/2000 | Smith |
| 6,241,462 B1 | 6/2001 | Wannasuphoprasit et al. |
| 6,299,139 B1 | 10/2001 | Kazerooni |
| 6,477,448 B1 * | 11/2002 | Maruyama .................. 700/302 |

* cited by examiner

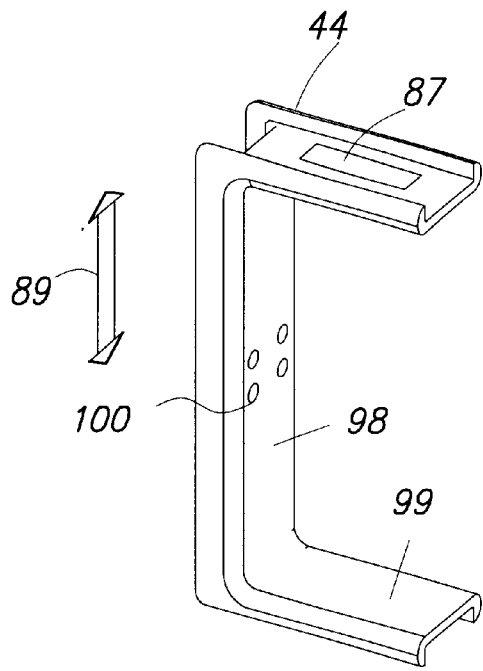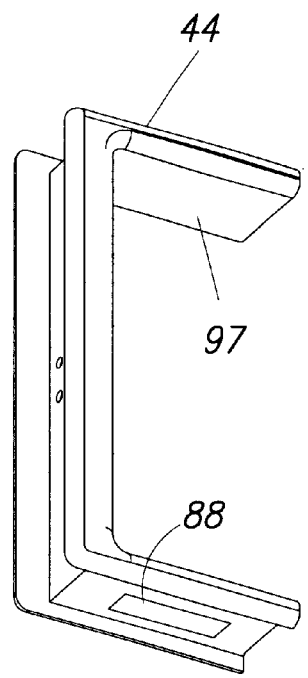
Figure 6A　　　　　Figure 6B
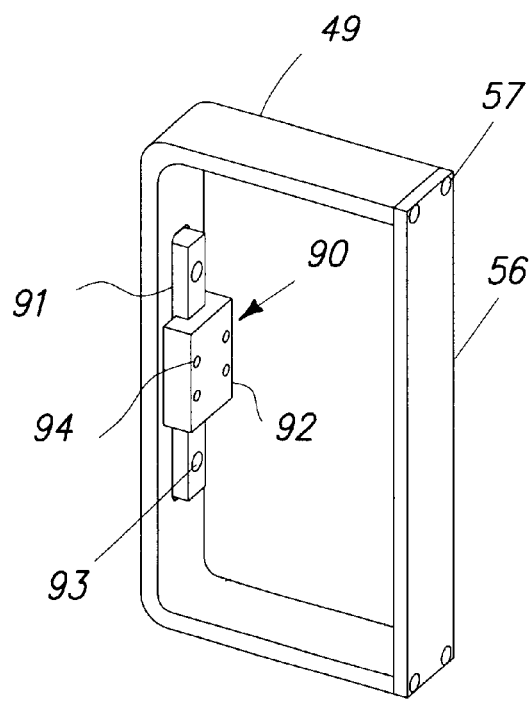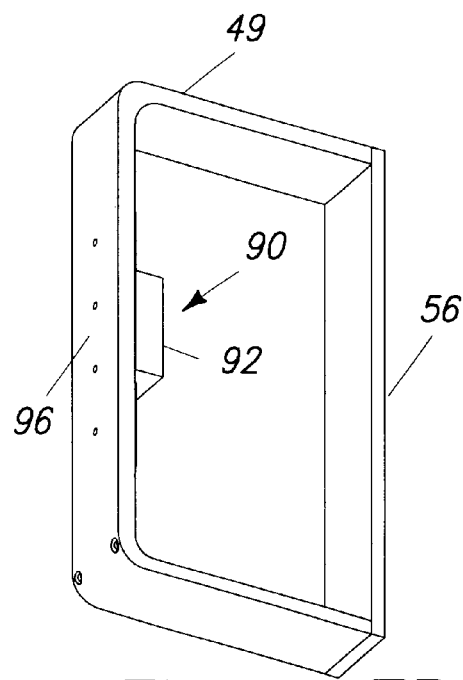
Figure 7A　　　　　Figure 7B

DEVICE AND METHOD FOR WIRELESS LIFTING ASSIST DEVICES

REFERENCE TO RELATED APPLICATIONS

This application claims priority to U.S. Provisional Application No. 60/325,586, filed Sep. 28, 2001.

GOVERNMENT SUPPORT

This work was supported in part by grants from NSF, grant numbers DMI-9713376. The government may have certain rights in this invention.

FIELD OF THE INVENTION

This invention relates to material handling devices. More specifically, this invention is a lift assist device that, among other components, includes a sensory glove and a controller. The sensory glove is worn by an operator and measures the vertical force that the wearer is imposing on an object that is being maneuvered by the lift assist device or on the lift assist device itself. The measured force is then transmitted in terms of radio frequency (RF) signals to the controller of the lift assist device. The lift assist device lowers and lifts the load so always the human operator exerts a pre-programmed small portion of the force, and the actuator of the material handling device provides the remaining force. Therefore, the actuator of the lift assist device adds effort to the lifting task only in response to the operator's hand force either on the object that is being maneuvered by the lift assist device or on the lift assist device itself.

BACKGROUND OF THE INVENTION

A new class of material handling devices is described in U.S. Pat. Nos. 5,915,673 and 5,865,426 (Kazerooni), where the human operator force on the material handling device is amplified electronically by use of a computer to drive the material handing device. FIG. 1 shows a lift assist device 17 according to specifications of U.S. Pat. Nos. 5,915,673 and 5,865,426. At the top of the device, a take-up pulley 18, driven by an actuator 28, is directly attached to a ceiling, wall, or overhead crane. Encircling pulley 18 is a line 26. Attached to line 26 is a sensory end-effector 46, that includes a human interface subsystem (including a handle 23) and a load interface subsystem, which in this embodiment includes a pair of suction cups 60. Human interface subsystem is designed to be gripped by a human hand and measures the human force, i.e., the force applied by an operator 24 against handle 23. Load interface subsystem is designed to interface with a load and contains various holding devices. In addition to suction cups 60 shown in FIG. 1, hooks and grippers are examples of other means that connect to load interface subsystems. Human interface subsystem contains a sensor (described in U.S. Pat. Nos. 5,915,673 and 5,865,426) that measures the magnitude of the vertical force exerted by human operator 24. A signal representing the human force imposed on sensory end-effector 46 by operator 24, as measured by the force sensor in handle 23, is transmitted to controller 20, via signal cable 48, which controls actuator 28 of lift assist device 17. A cable 21 is used for communication between actuator 28 and controller 20. Controller 20 causes lift assist device 17 to move sensory end-effector 46 and load (box 45) appropriately so always only a pre-programmed small proportion of the load force is supported by human operator 24, and the remaining force is provided by actuator 28 of the material handling system. If the operator's hand pushes upwardly on handle 23, take-up pulley 18 moves sensory end-effector 46 and box 45 upwardly. If the operator's hand pushes downwardly on handle 23, take-up pulley 18 moves sensory end-effector 46 and box 45 downwardly.

FIG. 2 shows an embodiment of the lift assist device 25 of the invention described here which is different from the devices described in U.S. Pat. Nos. 5,915,673 and 5,865,426. At the top of the device, a take-up pulley 18, driven by an actuator 28, is directly attached to a ceiling. Encircling pulley 18 is a line 26. Attached to line 26 is an end-effector 22. End-effector 22 of the invention here, as shown in FIG. 2, consists of only load interface components that attach to the load; end-effector 22 of this invention does not have any human interface subsystem to measure the human operator force. Instead lift assist device, 25, of this invention has an instrumented glove 10 that is not connected to line 26 or any part of the lift assist device, but is worn by operator 24 and therefore remains with operator 24. Instrumented glove 10 consists of a leather (or cloth) glove 29 with an embedded sensory system 11 (described in detail in later paragraphs). Embedded sensory system 11 in instrumented glove 10 measures the force exerted by human operator 24 on the object being lifted (container 47 in FIG. 2) or on the lift assist device itself. The signal representing operator vertical contact force is then sent to a transmitter circuitry 13 via a signal cable 19. Transmitter circuitry 13 transmits a set of control signals in terms of radio frequency (RF) signals or infrared (IR) signals 15 to a receiver circuitry 16 installed in controller 27 of the lift assist device. Once the transmitted control signals are received, they will then be used for processing and control of actuator 28 as a function of the measured operator vertical contact force. Using the data created by receiver circuitry 16, controller 27 calculates the necessary actuator speed to either raise or lower line 26 to create enough mechanical strength to assist the operator in the lifting task as required.

The important advantage of the lift assist device described here over the devices of U.S. Pat. Nos. 5,915,673 and 5,865,426 is that operator 24 is able to lift and lower a load by contacting any point either on the load (container 47 in the example of FIG. 2), or on the lift assist device itself. FIG. 27 shows an example of the material device where operator 24 is holding onto a handle 187 (connected to line 26) for lifting and lowering loads. In operating the devices described in U.S. Pat. Nos. 5,915,673 and 5,865,426, operator 24 needs to grab a handle which is a part of sensory end-effector 46 and includes a sensor to measure the operator force. End-effector 22 of the invention described here which interfaces line 26 and loads (container 47 in FIG. 2) does not have a sensor to measure operator force; it simply includes tools and equipments to grab loads. The human interaction force with the device is measured in a glove, which is always with the operator. The measured signal, representing the operator force, is then sent to a receiver wirelessly (e.g. via a RF signals) for control of the actuator of the lift assist device.

Since the instrumented glove is an important component of the invention described here, we will describe below the prior arts that relate to the instrumented glove of our invention. Currently, instrumented gloves are used in various applications. For instance, gloves with actuators that create forces on the fingers according to a set of computer instructions are designed to emulate forces on the wearer's fingers and thumbs in telerobotics and virtual reality applications. U.S. Pat. No. 5,184,319 (Kramer) and U.S. Pat. No. 5,143,505 (Burdea et al.) are patents teaching examples of this application of instrumented gloves.

Another type of instrumented glove device includes sensors that measure kinematics type data (i.e., position, orientation, and posture) of the fingers, thumbs and wrists for various applications. Applications for gloves with embedded sensors measuring kinematics type data include for example: transforming human hand movements into electronic letters and characters, controlling the movement and actions of video characters, providing biofeedback for sports training such as tennis and golf, and assessing the mobility of human and/or animal joints. Examples of transforming human hand movements into electronic letters and characters are taught by, for example, U.S. Pat. No. 4,414,537 (Grimes) and U.S. Pat. Nos. 5,047,952 and 6,035,274 (Kramer et al.). Examples of controlling the movement and actions of video characters are found in the inventions taught by U.S. Pat. No. 5,796,354 (Cartabiano et al.) and U.S. Pat. No. 4,613,139 (Robinson II). U.S. Pat. No. 6,032,530 (Hock) teaches a method and an apparatus with sensors to measure body movement and flexure during kinetic activities. U.S. Pat. No. 4,542,291 (Zimmerman), teaches an optical flex sensor that can be used to detect bending of human movements. U.S. Pat. No. 4,715,235 (Fukui) teaches an electro conductive woven or knitted fabric, which changes its electrical characteristics when stretched and can be used as a switch. And finally, examples of assessing the mobility of human and/or animal joints are taught by, for example, U.S. Pat. No. 4,444,205 (Jackson) and U.S. Pat. No. 4,986,280 (Marcus et al.).

A third type of instrumented glove in the prior art includes glove devices with some sort of sensors to measure the interaction with other objects. Examples include the inventions taught by U.S. Pat. No. 5,581,484 (Prince) describing an apparatus for manually entering information into a computer by generating a virtual keyboard, mouse, graphics tablet or other forms of input data, and U.S. Pat. No. 4,055,905 (Budrose) describing a system that facilitates learning to type. Gloves with sensors to measure the interaction with other objects also include safety and sports training applications, such as taught by, for example, U.S. Pat. No. 6,016,103 (Leavitt) describing a glove to detect whether or not a motor vehicle driver is sleeping, and U.S. Pat. No. 5,669,809 (Townsend) describing a safety glove to be used in conjunction with a cutting machine, U.S. Pat. No. 5,681,993 (Heitman) and U.S. Pat. No. 4,488,726 (Murray) describing gloves for monitoring human gripping force on a golf club or on an aircraft control stick. Similarly, U.S. Pat. No. 6,126,572 (Smith) describes an apparatus for monitoring and displaying information related to pressure exerted at a point of interest during an isometric exercise, and U.S. Pat. No. 5,723,786 (Klapman) describes a boxing glove capable of measuring impact forces. And finally, U.S. Pat. Nos. 5,662,123, 5,449,002, 5,775,332 (Goldman et al.) and U.S. Pat. No. 6,033,370, (Reinbold et al.) describe capacitive sensor which has a plurality of layers forming a force detector which can be embedded in various patients' shoe, boot, ankle, brace, crutch and handgrip to provide biofeedback to help patients relearn function or prevent atrophy.

Thus, prior to the present invention a need remained in the art for a more versatile device for maneuvering a manual material handling system that requires very little force from the operator and, wherein the operator directs the maneuvering of the material handling device to move an object, by pushing on any point on the material handling device or pushing on the object being maneuvered. Moreover, a system is also further needed to provide assistance for lifting the material handling device proportionally based on the force imposed by the operator, so that the operator provides only a small portion of the total force needed to lift the material handling device. Nevertheless, no prior art instrumented glove type device is designed for assisting manual material handling systems.

SUMMARY OF THE INVENTION

The present invention describes a lift assist device for lifting and lowering at least one object, among other components, comprising: an actuator arranged to turn a pulley; a line wound on said pulley and connectable to said object; an instrumented glove wearable by a human hand, wherein said instrumented glove detects a contact force imposed by said human hand on object or a part of said lift assist device, and generates a set of contact signals representing said contact force; at least one transmitter circuitry capable of transmitting a set of control signals representing said contact signals to other locations; and a controller to receive and process said control signals and to generate command signals to control said actuator to cause said device to lower or lift said object. Additional objects, advantages and novel features of the invention will be set forth in part in the description and figures which follow, and in part will become apparent to those skilled in the art on examination of the following, or may be learned by practice of the invention.

DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown.

FIG. 6A and FIG. 6B demonstrate two views of the inner bracket of the sensory system in the first embodiment of the instrumented glove.

FIG. 7A and FIG. 7B demonstrate two views of the outer bracket of the sensory system of the first embodiment of the instrumented glove.

DESCRIPTION OF PREFERRED
EMBODIMENTS OF THE INVENTION

Figure 1:
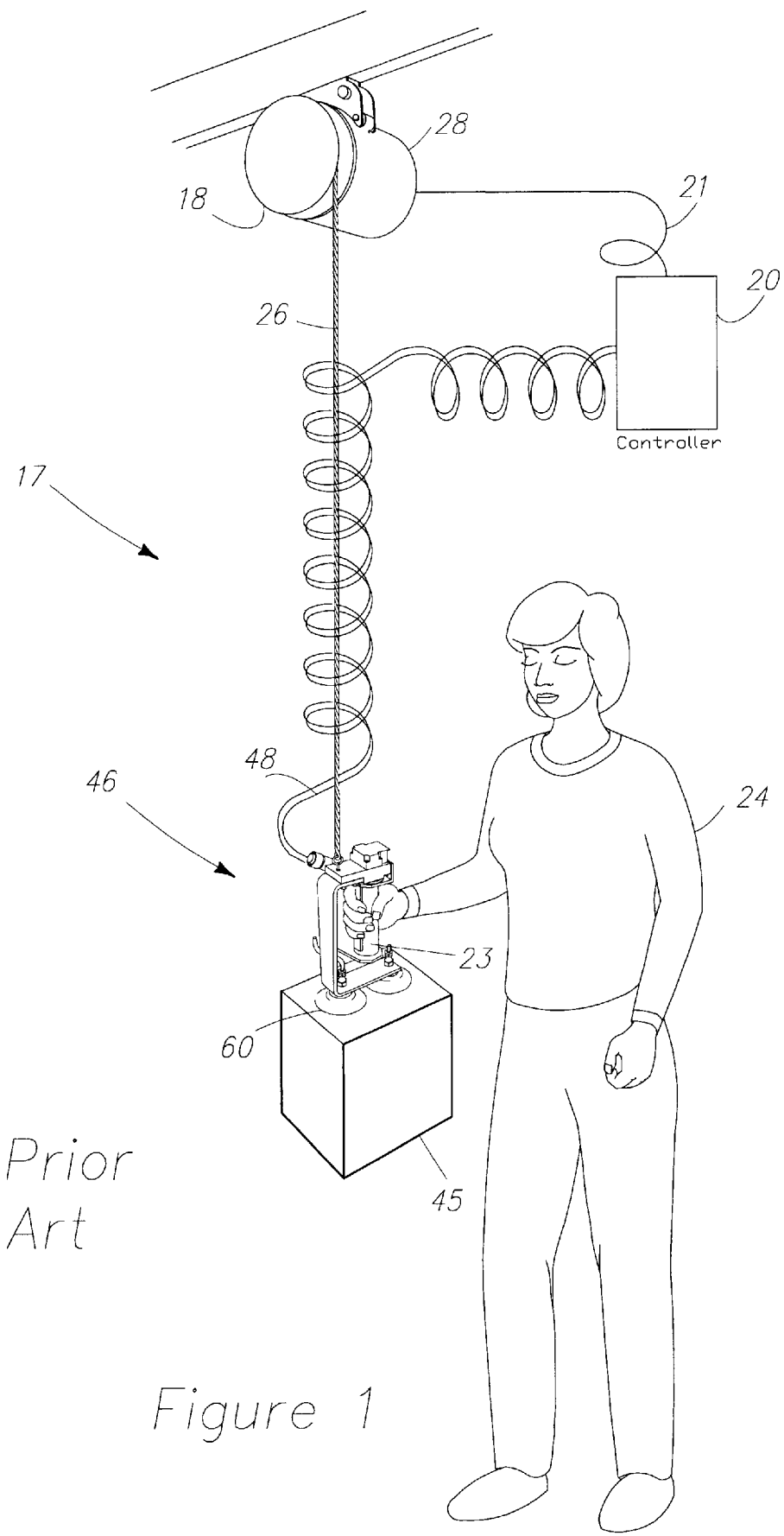
FIG. 1 illustrates an embodiment of the lift assist device according to specifications of U.S. Pat. Nos. 5,915,673 and 5,865,426.
Figure 2:
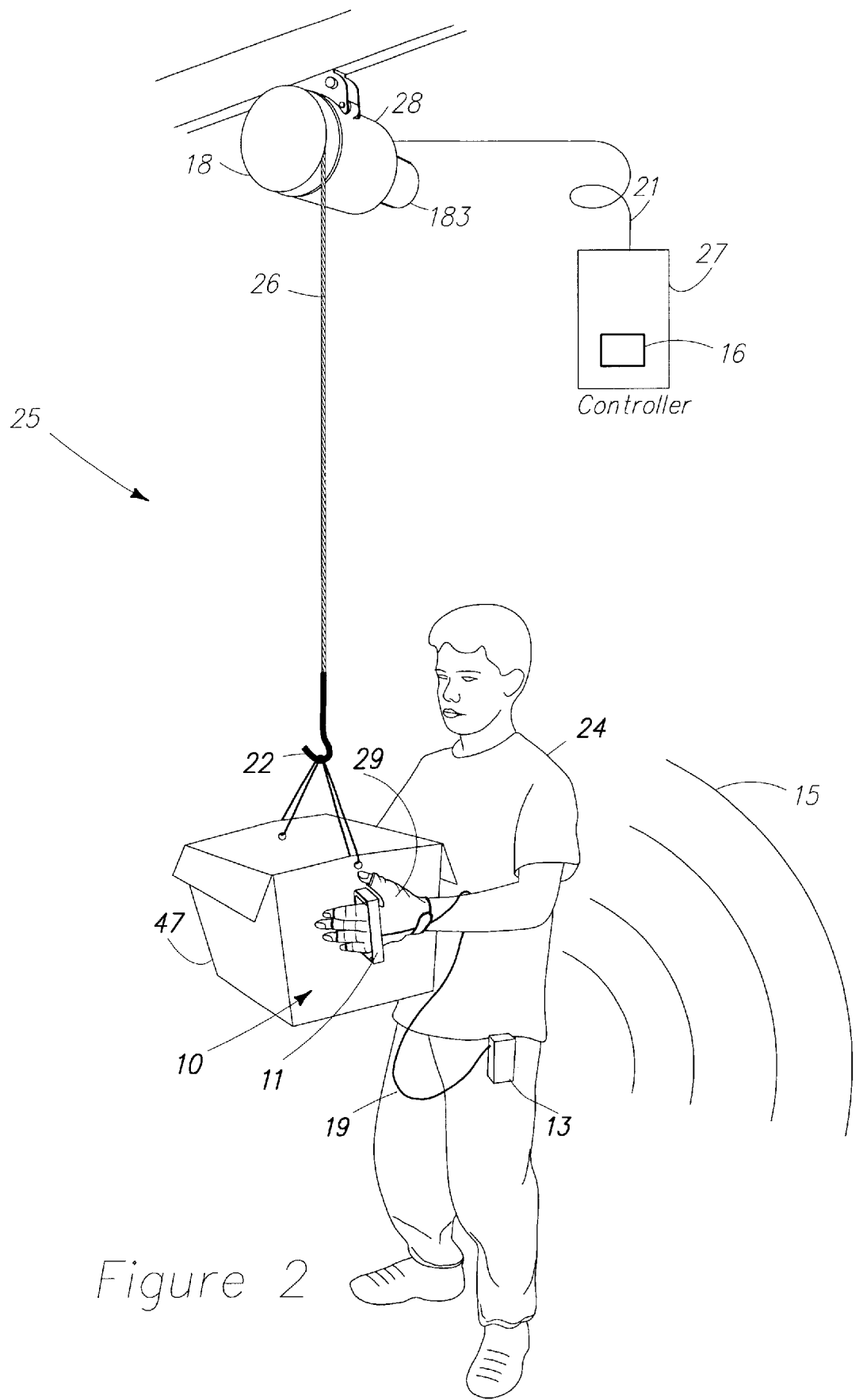
FIG. 2 illustrates the first embodiment of the wireless lift assist device.
Figure 3:
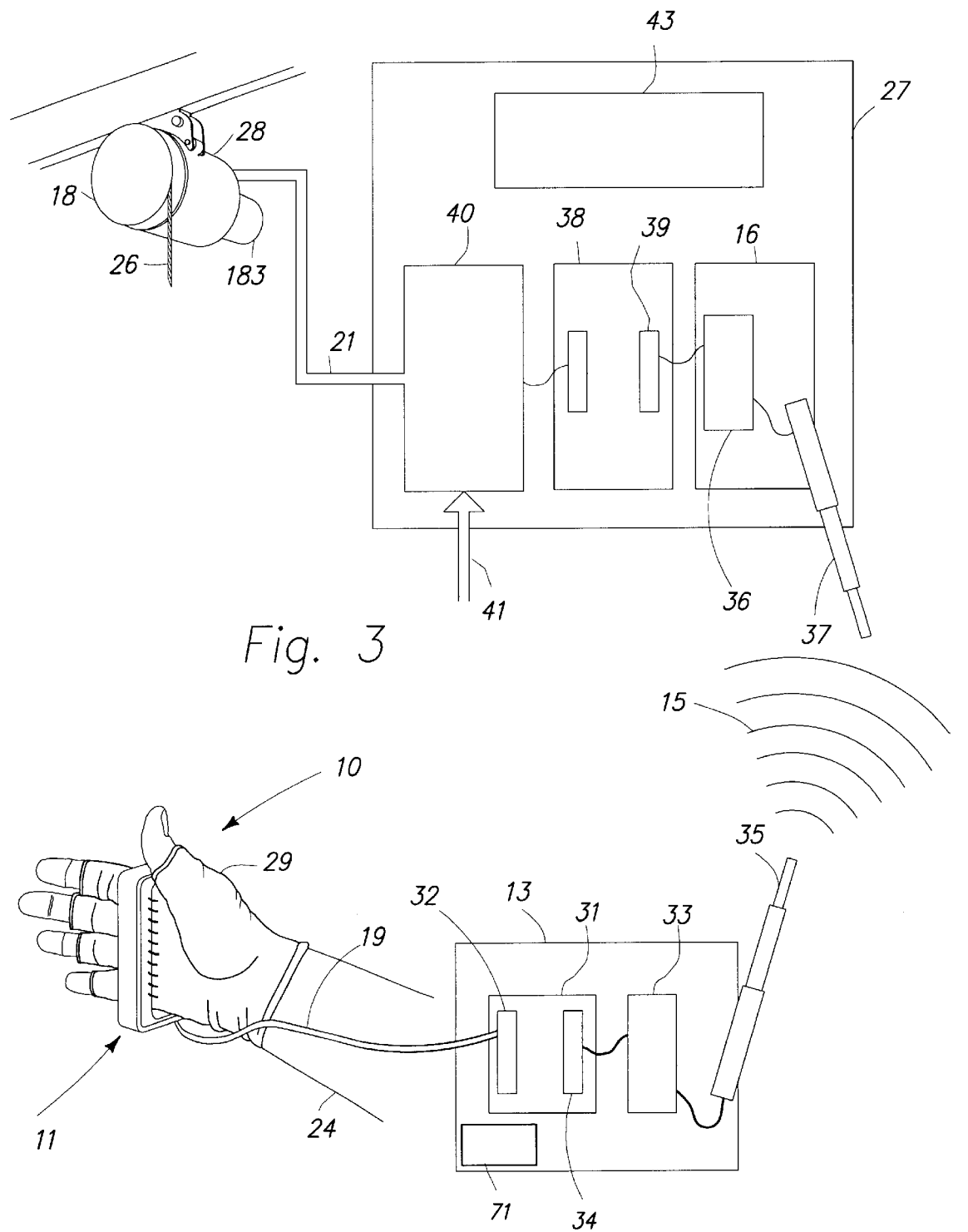
FIG. 3 illustrates the details of the wireless data transfer between the instrumented glove and the controller of the lift assist device.

FIG. 3 illustrates a schematic architecture of a wireless data exchange between transmitter circuitry 13 (integrated with the instrumented glove 10 or attached to operator 24 as shown in FIG. 2) and receiver circuitry 16. The receiver circuitry 16, in this embodiment, is integrated in controller 27, however it could be located at other locations.

An essential part of transmitter circuitry 13 is a micro-controller 31. For the first embodiment of this invention, we used an 8-bit micro-controller manufactured by Motorola (Motorola part no. MC68HC705B16CFN). This particular micro-controller is the most widely used general-purpose 8-bit micro-controller in the US. There are many types of micro-controllers that are known to and practicable in the present invention by one ordinary skilled in the art. One could also use a digital signal processor such as TMS320C240 (16 bit digital signal processor) manufactured by Texas Instrument.

The contact signals from sensory system 11 (part of instrumented glove 10) are first read by analog to digital converter (ADC) 32 of micro-controller 31 and then collected into the micro-controller's memory. Micro-controller 31 generates a set of information signals as a function of the collected contact signals. This set of information signals, generated in micro-controller 31 is then passed to RF transmitter module 33 one bit at a time (serial streams) using Serial Communications Interface (SCI) 34 located in micro-controller 31. Transmitter module 33 used in the first embodiment of this invention has a maximum data transfer rate of 50 kbps (kilobauds per second), and therefore dictates the maximum rate at which micro-controller 31 can feed RF transmitter module 33. The baud rate closest to this maximum that is available is 41667 bps, and is the rate selected.

Transmitter module 33 used in this project is the HP Series-II transmitter manufactured by Linx Technologies (Linx Technologies part no. TXM-900-HP-II). The HP Series-II operates in the 902–928 MHz band, and offers simplified integration into wireless product designs. Other features of transmitter module 33 are 8 selectable channels and the ability to transmit either analog or digital data. Transmitting antenna 35 in transmitter circuitry 13 functions as a coupling device that allows for transmission of a set of RF waves 15 as a function of the information signals collected by transmitter module 33. Note that RF waves 15, transmitted in the air through transmitting antenna 35 represent the contact signals or the operator vertical contact force and can easily be collected by any receiving antenna. For the exemplary embodiment, the transmitting antenna used is the flat "Splatch" antenna, manufactured by Linx Technologies (Linx part no. ANT-916-SP). The compactness of this allows it to be concealed within the enclosure of transmitter circuitry 13, which makes it better suited for portable devices. An alternative is a "whip" style antenna, the use of which would have afforded somewhat better performance but would have made the transmitter unit more cumbersome. A battery 71 with proper voltage and current limit is also included in transmitter circuitry 13 to power all components of the transmitter circuitry 13 and embedded sensory system 11.

The structure and components of receiver circuitry 16 are in many ways similar to those of transmitter circuitry 13. The receiver circuitry 16, in this embodiment, is located inside controller 27. Electronic controller 27 controls actuator 28. In a preferred embodiment, controller 27 essentially contains four major components: a receiver circuitry 16, a computer 38, a power amplifier 40, and a logic circuitry 43.

Receiver circuitry 16 includes an RF receiver module 36 and a receiving antenna 37. Receiver module 36 receives RF waves 15 through receiving antenna 37 for use by other parts of lift assist device controller 27. After detecting, filtering, and amplifying a transmitted signal, receiver module 36 makes a set of data available to a computer 38 through a Serial Communications Interface (SCI) 39 feature of computer 38. Receiver module 36 (Linx Technologies part no. RXM-900-HP-II) operates in the same band as transmitter module 33 (902–928 MHz), separated into 8 selectable channels. The data received in controller 27 will be used to control the speed of actuator 28 that turns pulley 18.

An analog circuit, a digital circuit, or a computer 38 with input output capability and standard peripherals processes the data received from RF receiver module and various sensors and switches and to generate command signals for actuator 28. There are many control algorithms that generate command signals as a function of operator vertical contact force. Using the measurement of the operator vertical contact force, computer 38 calculates the amount of rotation necessary to create enough mechanical strength to assist the operator in the moving task. Refer to allowed U.S. patent application Ser. No. 09/443,278 for more details on various control algorithms applicable to the invention described here.

Power amplifier 40 allows the transfer of power to actuator 28 as a function of the command signals from computer 38. If actuator 28 is powered electrically, a power amplifier 40 (e.g. PWM amplifier or proportional amplifier which receives a constant-voltage electric power from a power supply) will be used. Power amplifier 40 delivers the proper amount of power to actuator 28 based on the command signals computed within computer 38. Arrow 41 in FIG. 3 represents the constant voltage to power amplifier 40 from an external power source while cable 21 represents the modulated power delivered to actuator 28 from power amplifier 40. If actuator 28 is powered pneumatically or hydraulically, a pneumatic or a hydraulic servo-valve, which receives pressurized air or fluid from a compressor, will be used instead of power amplifier 40. This pneumatic or hydraulic servo-valve delivers the proper amount of pressurized air or fluid to actuator 28 based on the command signal computed within computer 38.

Finally logic circuitry 43, composed of electromechanical or solid state relays start and stop the system depending on a sequence of possible events. For example, the relays are used to start and stop the entire system operation using push buttons installed either on controller 27, on instrumented glove 10 or somewhere in the vicinity and reach of operator 24. The relays also engage a friction brake, 183, in the presence of power failure or when operator 24 leaves the system. As would be apparent to one skilled in the art, many alternatives are available for a logic circuitry 43 to create safe start-stop operation for the system.

Also note that the instrumented glove described here is not confined to represent ordinary wearable gloves instrumented with force sensors. The terminology "instrumented glove" is used here to encompass all kinds of gloves, hand pieces, palm, hand and finger covering devices, brace type devices or any type of device that can be connectable and wearable by human hand and measures the human force imposed on an object and transmits RF signals (RF waves) representing the measured force to a receiver located in another location.

The term Radio Frequency (RF) refers to the electromagnetic field that is generated when an alternating current is input to an antenna. RF radiation, can be used for wireless broadcasting and communications over a significant portion of the electromagnetic radiation spectrum—from about 3 kilohertz (kHz) to thousands of gigahertz (GHz). Usually Microwave (MW) radiation is considered a subset of RF radiation, although an alternative convention treats RF and MW radiation as two spectral regions. Microwaves occupy the spectral region between 100 MHz and 300 GHz. As the frequency is increased beyond the RF spectrum, electromagnetic energy takes the form of infrared (IR), visible light, ultraviolet (UV), X rays, and gamma rays. Many types of wireless devices make use of RF fields—radio, television, cordless and cellular telephones, satellite communication systems, and many measuring and instrumentation systems used in manufacturing.

RF waves (some times referred to as RF signals) have different frequencies, and by tuning a radio receiver to a specific frequency one can pick up a specific signal. In the U.S. the FCC (Federal Communications Commission) decides who is able to use what frequencies for what purposes, and it issues licenses to stations for specific frequencies. All FM radio stations transmit in a band of frequencies between 88 megahertz and 108 megahertz. This band of the radio spectrum is used for no other purpose but FM radio broadcasts. In the same way, AM radio is confined to a band from 535 kilohertz to 1,700 kilohertz. Other common frequency bands include the following:

Television stations: 54–88 megahertz for channels 2–6
  Television stations: 174–220 megahertz for channels 7–13
  Garage door openers, alarm systems, etc.: around 40 megahertz
  Standard cordless phones: Bands from 40 to 50 megahertz
  Baby monitors: 49 megahertz
  Radio controlled airplanes: around 72 megahertz
  Cell phones: 824 to 849 megahertz
  New 900 MHz cordless phones: Obviously around 900 megahertz!

Figure 4A:
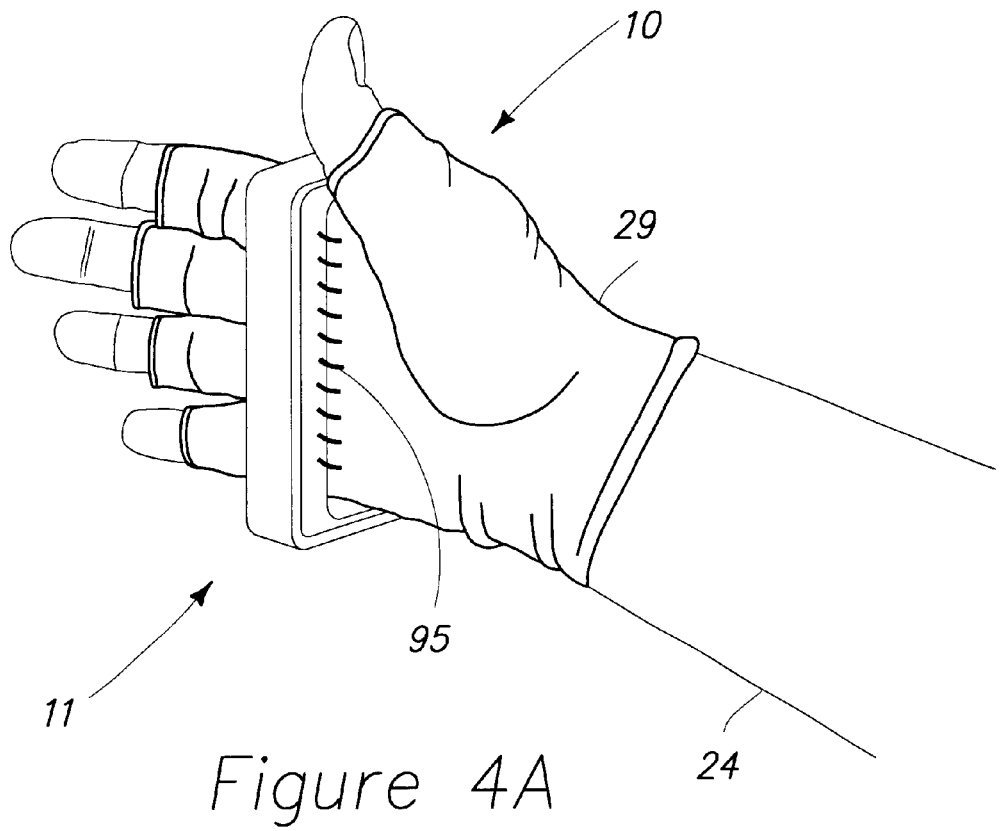
FIG. 4A and FIG. 4B illustrate two views of the first embodiment of the instrumented glove.
Figure 4B:
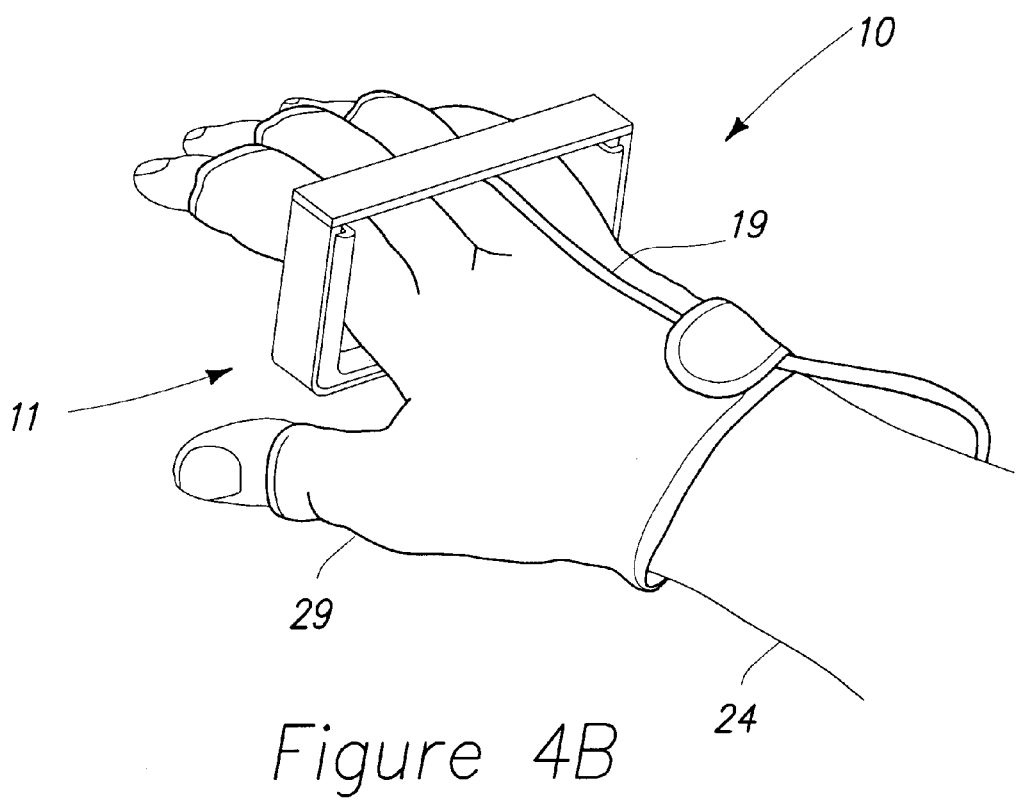

We now describe, in detail, the architecture of the instrumented glove that allows for measurement of the operator force. The first embodiment of the instrumented glove 10 is shown in FIG. 4A and FIG. 4B. A regular fabric glove 29 (similar to a bicyclist glove) is used as the foundation of this instrumented glove 10. The sensory system 11 is connected to the glove at location 95 and measures the force imposed by operator hand on any object he/she is grasping or contacting. In this embodiment, signal cable 19 is used to transfer the measurement of the operator force from sensory system 11 to transmitter circuitry 13 (not shown in FIG. 4A and FIG. 4B). In this first embodiment, transmitter circuitry 13 is worn by operator 24 on his/her wrist (like a watch) or on his/her belt (like a cell phone as shown in FIG. 3). Later on, another embodiment is described where transmitter circuitry 13 is integrated within sensory system 11 eliminating signal cable 19.

Figure 5:
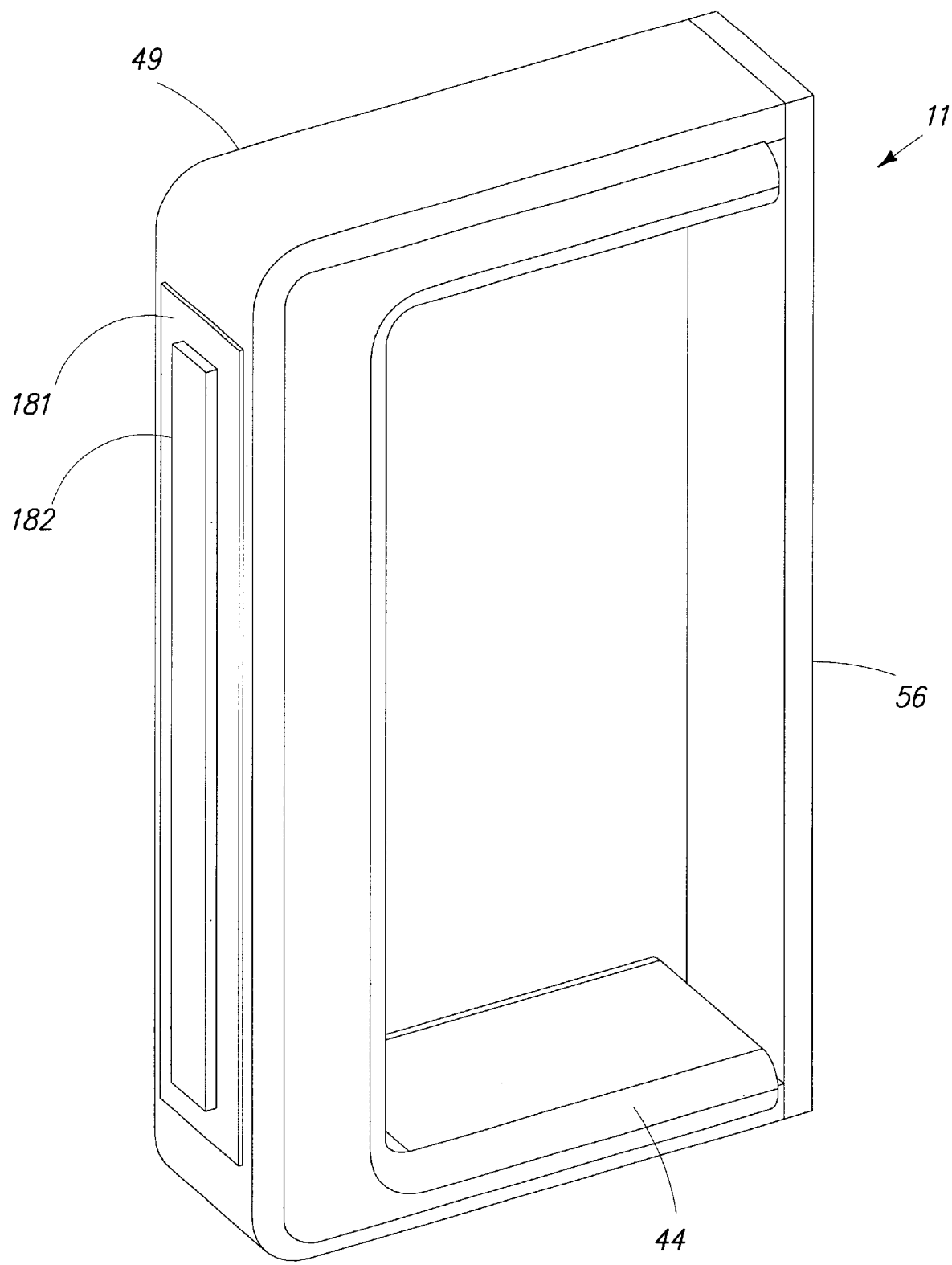
FIG. 5 illustrates the sensory system of the first embodiment of the instrumented glove.

FIG. 5 shows sensory system 11 of FIG. 4A and FIG. 4B in more details where glove 29 is removed for clarity. Sensory system 11, in this first embodiment, essentially consists of two overlapping inner bracket 44 and outer bracket 49. Inner bracket 44 is shown by two perspective views in FIG. 6A and FIG. 6B. Outer bracket 49 is shown by two perspective views in FIG. 7A and FIG. 7B. Inner bracket 44 is connected to glove 29 in three surfaces 97, 98, and 99 by glue or other fastening means. In the first embodiment of this invention, inner bracket 44 was sewn at location 95 (shown in FIG. 4A). The function of inner bracket 44 is to create solid surfaces so the operator can push on. One important design feature of inner bracket 44 is that it be able to slide relative to outer bracket 49 freely along arrow 89 (shown in FIG. 6A). The sliding motion between inner bracket 44 and outer bracket 49 is very small and can be created by several methods. In the first embodiment, a linear bearing 90 (shown in FIG. 7A) is employed between inner bracket 44 and outer bracket 49 to create a smooth and frictionless motion between them. Linear bearing 90 consists of two components: a rail 91 and a slider 92. Rail 91 is secured to outer bracket 49 via fasteners 93. Slider 92, riding freely on rail 91, is connected to inner bracket 44 via four fasteners. Threaded holes 94 on slider 92 represent the means of connection of slider 92 to inner bracket 44. Four holes 100 on inner bracket 44 match threaded holes 94 on slider 92.

Two force sensors 87 and 88 (described below) are installed on the outer side of inner bracket 44. Note that operator hand, glove 29 and inner bracket 44, taken together, are free to move relative to outer bracket 49 along arrow 89. Of course this motion is quite limited by sensors 87 and 88. Now suppose the operator hand, wearing instrumented glove 10 is in firm contact container 47 (similar to FIG. 2) such that surface 96 of outer bracket 49 is touching the surface of container 47. When inner bracket 44 (along with hand and glove) is pushed upwardly, then force sensor 87 measures the compression upward force that inner bracket 44 is imposing on outer bracket 49. Similarly when inner bracket 44 is pushed downwardly, then force sensor 88 measures the downward compression force that inner bracket 44 is imposing on outer bracket 49. Since outer bracket 49 is in firm contact with a load, therefore, the measured forces by sensors 87 and 88 represent the forces that are imposed on the load by outer bracket 49.

Figure 8:
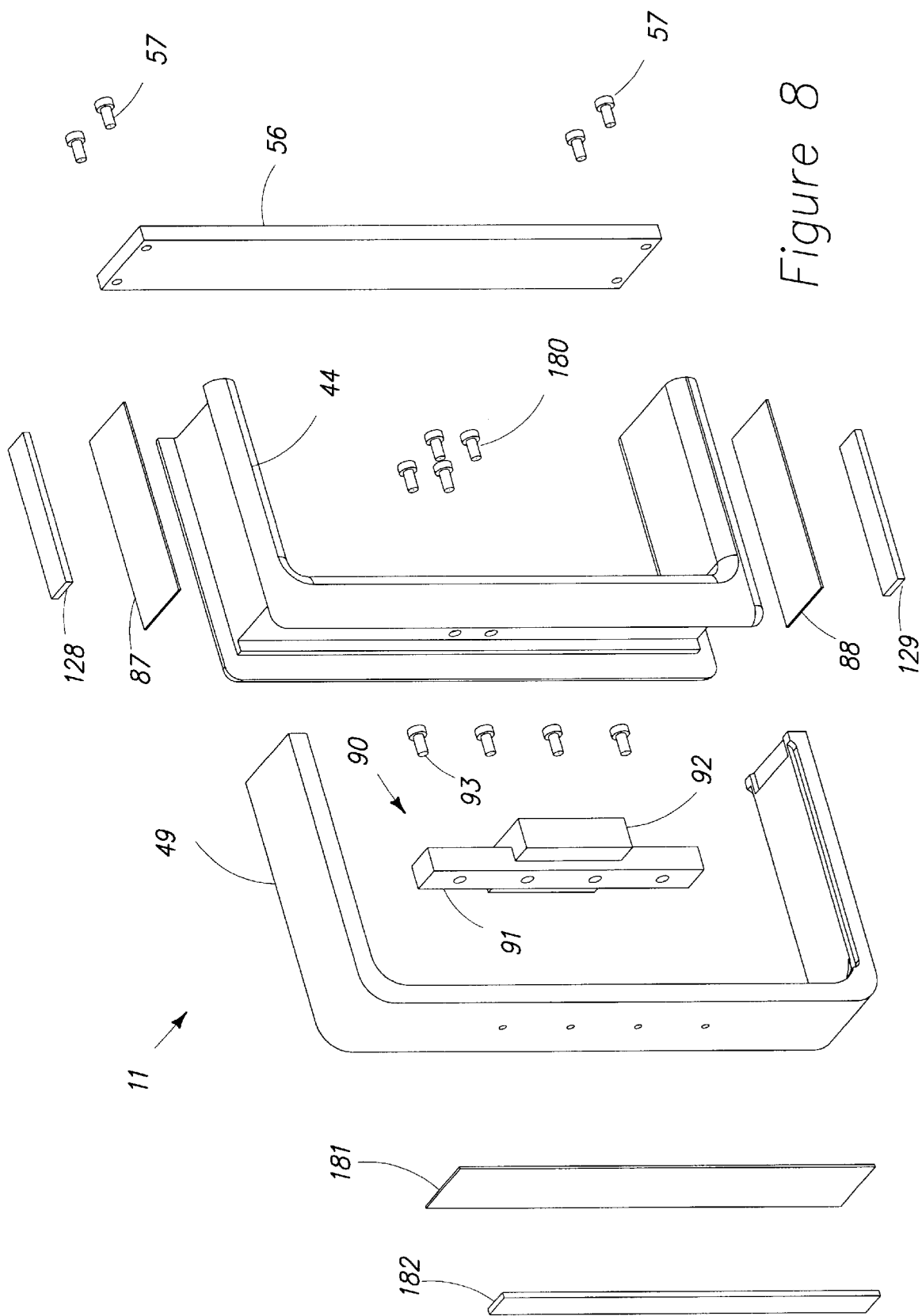
FIG. 8 demonstrates the exploded view of the first embodiment of the instrumented glove.

FIG. 8 shows an exploded view of sensory system 11. A holding bracket 56 is connected to outer bracket 49 via fasteners 57. The function of holding bracket 56 is two fold; it not only adds structural rigidity to outer bracket 49 but also creates a platform to hold signal cables from sensors 87 and 88. Two rubber strips 128 and 129 are glued onto force sensors 87 and 88. Rubber strips 128 and 129 occupy the space between inner bracket 44 and outer bracket 49 and allow for concentration of the force on force sensors 87 and 88. Four fasteners 180 are used to connect inner bracket 44 to slider 92. Force sensing resistor 181 is also glued to outer bracket 49. This force-sensing resistor is able to measure the horizontal operator force onto any object the instrumented love is in contact with. The measured signal from this force sensor, in this embodiment, will not be used directly to move the end-efffector vertically; it is used as a dead man switch to declare that the operator is in contact with the load. When the operator pushes onto a load (e.g., container 47 in FIG. 2) horizontally, sensor 181 measures a signal and transmitter circuitry 13 sends a logic signal to controller 27 causing the end-effector to follow the operator hand. When the operator does not push against the container 47, no force is measured by force sensor 181 and transmitter circuitry sends a different logic signal to the controller 27 causing the end-effector to remain stationary. In a preferred embodiment of this invention, a friction brake 183 has been installed on actuator 28 (shown in FIG. 2). The friction brake engages whenever the operator does not push against sensor 181 or at any time there is a power failure. A rubber strip 182 is glued onto the force sensor 181 and allows for concentration of the force on force sensor 181. There are many types of force sensors that can be installed in instrumented glove 10 that are known to and practicable in the present invention by one skilled in the art.

Figure 9A:
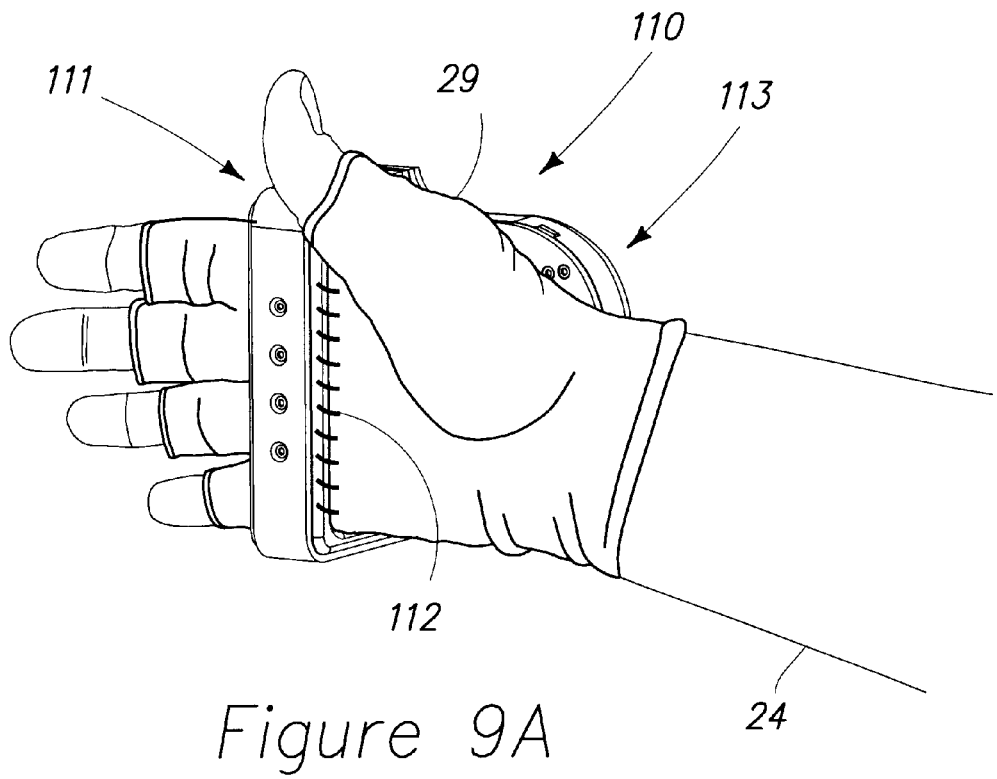
FIG. 9A and FIG. 9B demonstrate two views of the second embodiment of the instrumented glove.
Figure 9B:
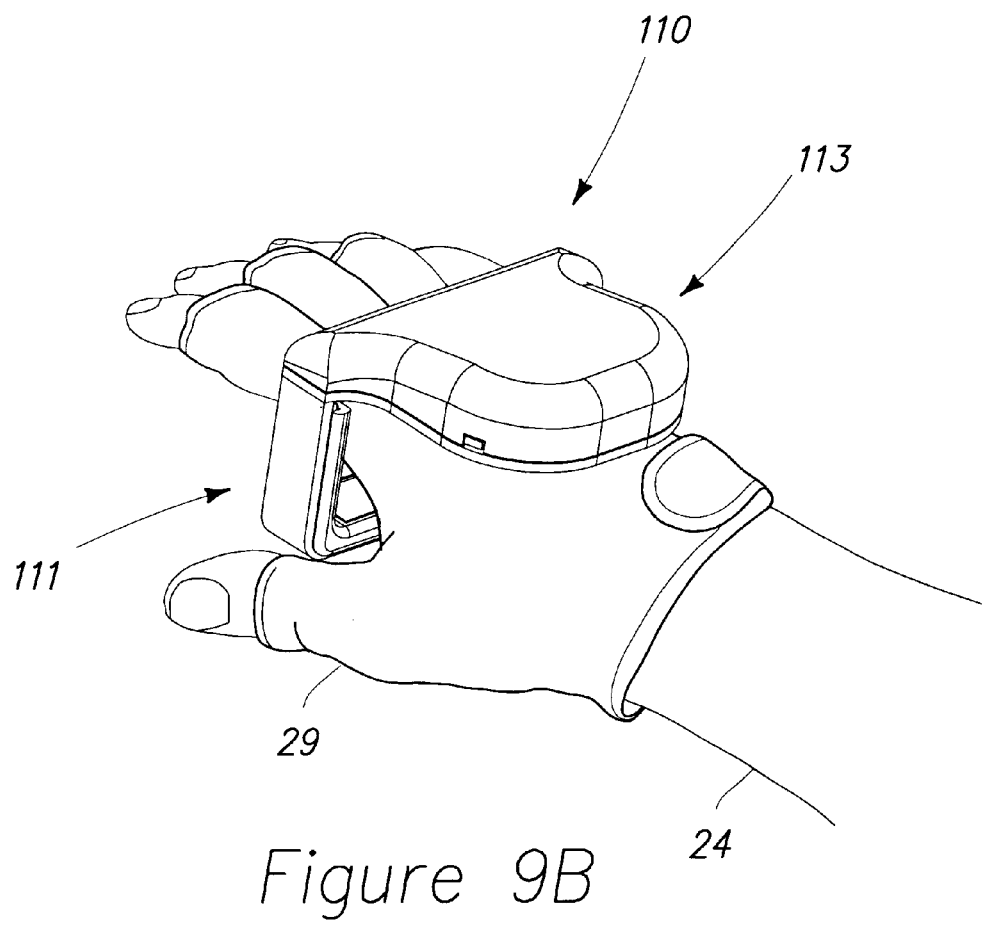

The second embodiment of the instrumented glove 110 is shown in FIG. 9A and FIG. 9B. A regular fabric glove 29 (similar to a bicyclist glove) is used as the foundation of instrumented glove 110. Sensory system 111 is connected to glove 29 and measures the force imposed by operator hand on any object he/she is grasping or contacting. As shown in FIG. 9A and FIG. 9B, sensory system Ill is sewn to glove 29 at location 112. An important difference between this second embodiment of the invention and the first embodiment of this invention (shown in FIG. 5) is that transmitter circuitry 113 in the second embodiment is connected to sensory system 111. In the first embodiment of the invention, transmitter circuitry 13 is worn by operator 24 on his/her wrist (like a watch) or on his/her belt (like a cell-phone) and signal cable 19 was used for communication between transmitter circuitry 13 and sensory system 11.

Figure 10:
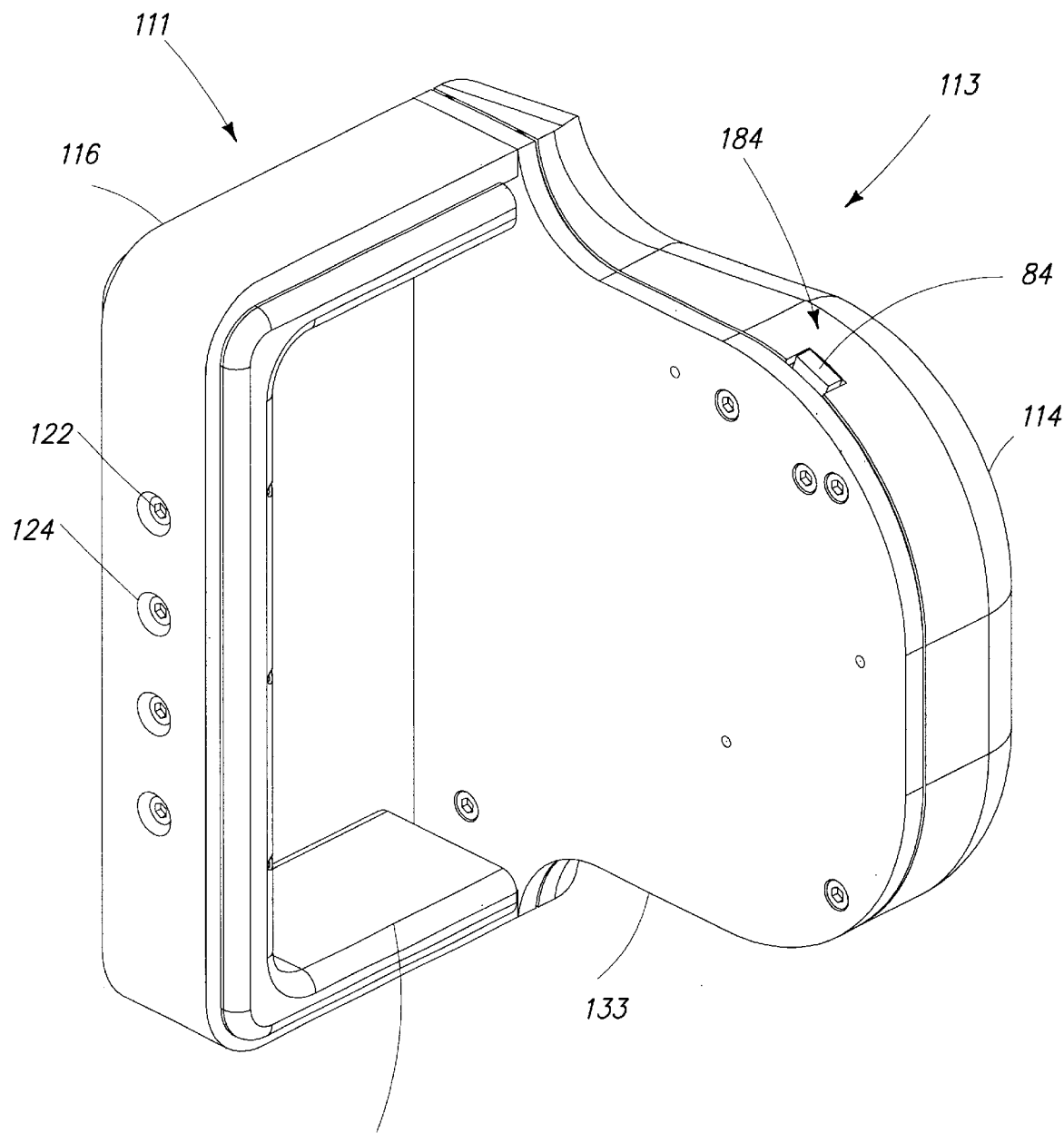
FIG. 10 demonstrates the sensory system and transmitter module of the second embodiment of the instrumented glove.
Figures 11A, 11B:
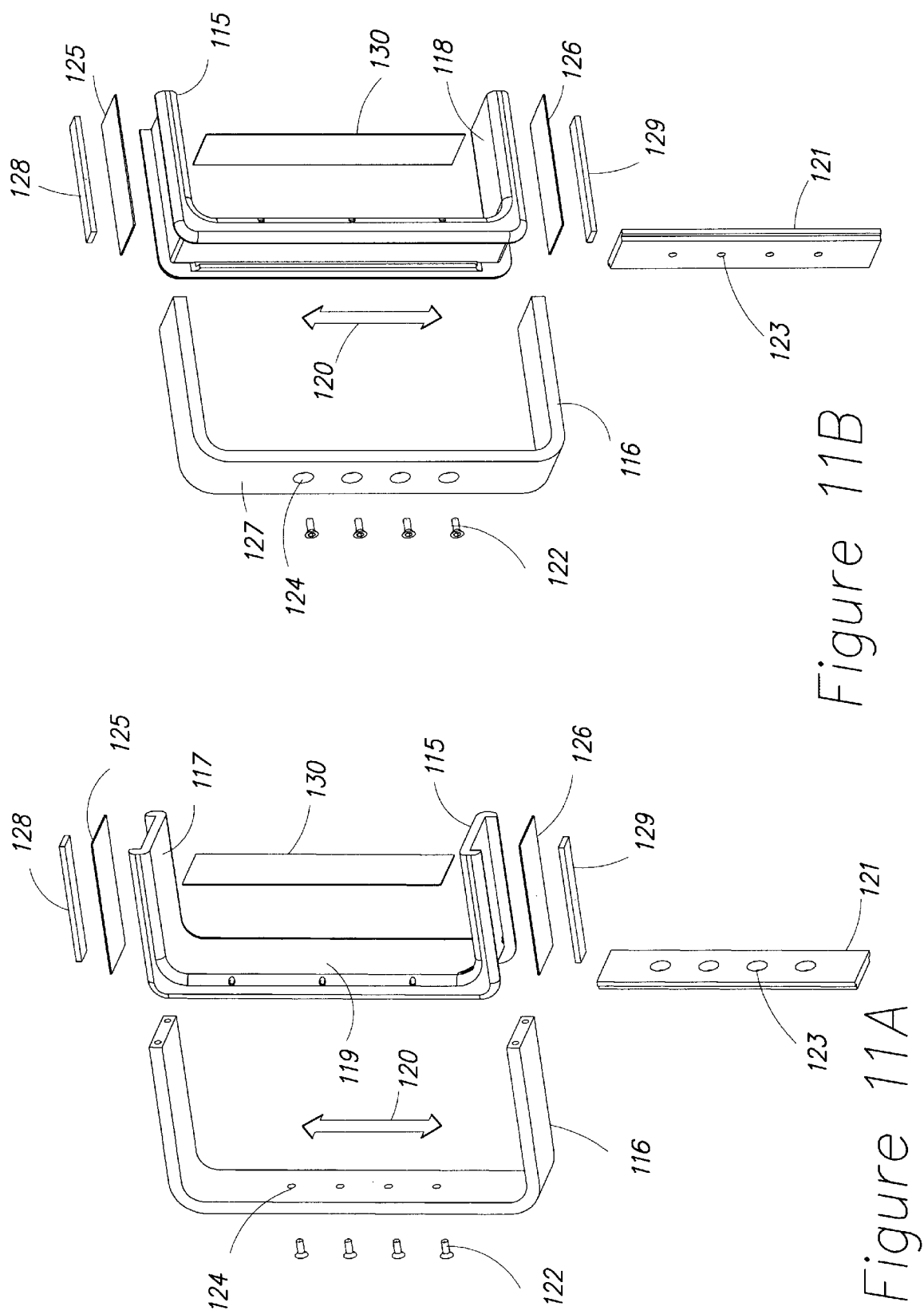
FIG. 11A and FIG. 11B demonstrate two exploded views the sensory system of the second embodiment of the instrumented glove.

FIG. 10 shows integrated sensory system 111 and transmitter circuitry 113 where glove 29 is removed for clarity. FIG. 11A and FIG. 11B show two exploded views of the sensory system 111 where transmitter circuitry 113 is removed for clarity. Sensory system 111 of the second embodiment of this invention, similar to sensory system of the first embodiment of this invention, essentially consists of two overlapping brackets 115 and 116. Inner bracket 115 is in contact with glove 29 in three surfaces 117, 118, and 119. In this second embodiment of this invention, inner bracket 115 was sewn at location 112 (shown in FIG. 9A). The function of inner bracket 115 is to create solid surfaces so the operator can push on. One important design feature of inner bracket 115 is that it be able to slide relative to outer bracket 116 freely along arrow 120. The sliding motion between inner bracket 115 and outer bracket 116 is very small and can be created by several methods. In this second embodiment, a Teflon coated rectangular plate 121 (shown in FIG. 11A and FIG. 11B) is installed between inner bracket 115 and outer bracket 116 to create a smooth and frictionless motion between them. This Teflon coated plate is secured to outer bracket 116 via fasteners 122. Threaded holes 123 represent the means of connection of plate 121 to outer bracket 116. Four holes 124 on outer bracket 116 match the threaded holes 123 on Teflon coated plate 121. Two force sensing resistors 125 and 126 (described below) are installed on the outer side of inner bracket 115. Note that operator hand, glove 29 and inner bracket 115, taken together, are free to move relative to outer bracket 116 along arrow 120. Of course this motion is quite limited by sensors 125 and 126. Now suppose the operator hand, wearing instrumented glove 110 is in firm contact with a box (e,g. container 47 in FIG. 2) such that surface 127 of outer bracket 116 is touching the surface of container 47. When inner bracket 115 (along with hand and glove) is pushed upwardly, then force sensor 125 measures the compression upward force that inner bracket 115 is imposing on outer bracket 116. Similarly when inner bracket 115 is pushed downwardly, then force sensor 126 measures the downward compression force that inner bracket 115 is imposing on outer bracket 116. Since outer bracket 116 is in firm contact with container 47, therefore, the measured forces by sensors 125 and 126 represent the forces that are imposed on container 47 by outer bracket 116. Two rubber strips 128 and 129 are glued onto the force sensors 125 and 126. Rubber strips 128 and 129 occupy the space between inner bracket 115 and outer bracket 116 and allow for concentration of the force on force sensors 125 and 126.

Force sensor resistor 130 is also glued to inner bracket 115. This force-sensing resistor is able to measure the horizontal operator force onto inner bracket 115. The measured signal from this force sensor will not be used directly to move the end-effector; it is used as a dead man switch to declare that the operator is in contact with the load. When the operator pushes onto inner bracket 115 horizontally, sensor 130 measures a signal and transmitter circuitry 113 sends a logic signal to controller 27 causing the end-effector to follow the operator hand. When the operator does not push against inner bracket 115, no force is measured by force sensor 130 and transmitter circuitry 113 sends a different logic signal to controller 27 causing the end-effector to remain stationary. In a preferred embodiment of this invention, a friction brake 183 has been installed on actuator 28. The friction brake engages whenever the operator does not push against sensor 130 or at any time there is a power failure.

Figure 12:
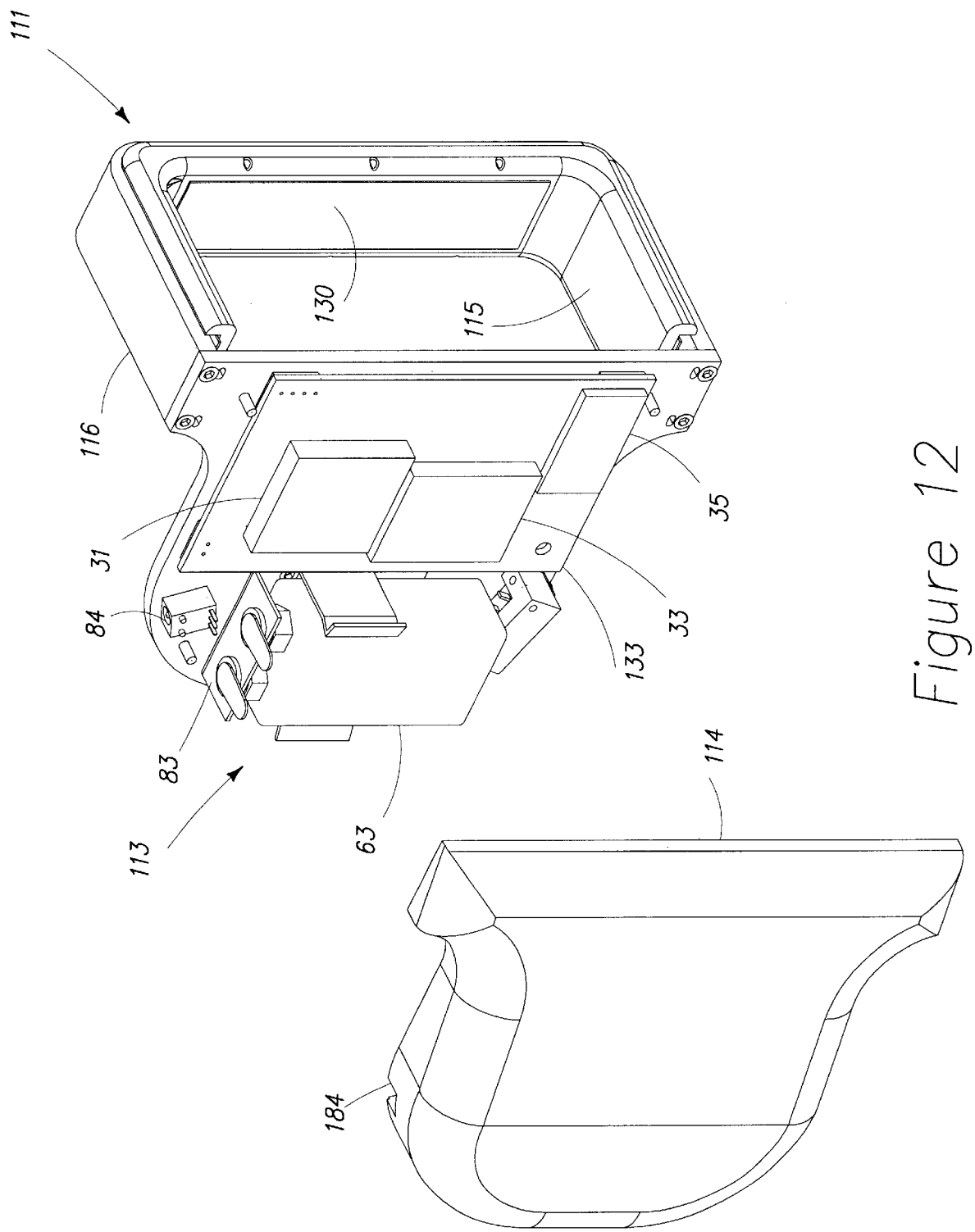
FIG. 12 demonstrates the sensory system and transmitter module of the second embodiment of the instrumented glove where the cap has been removed.
Figure 13:
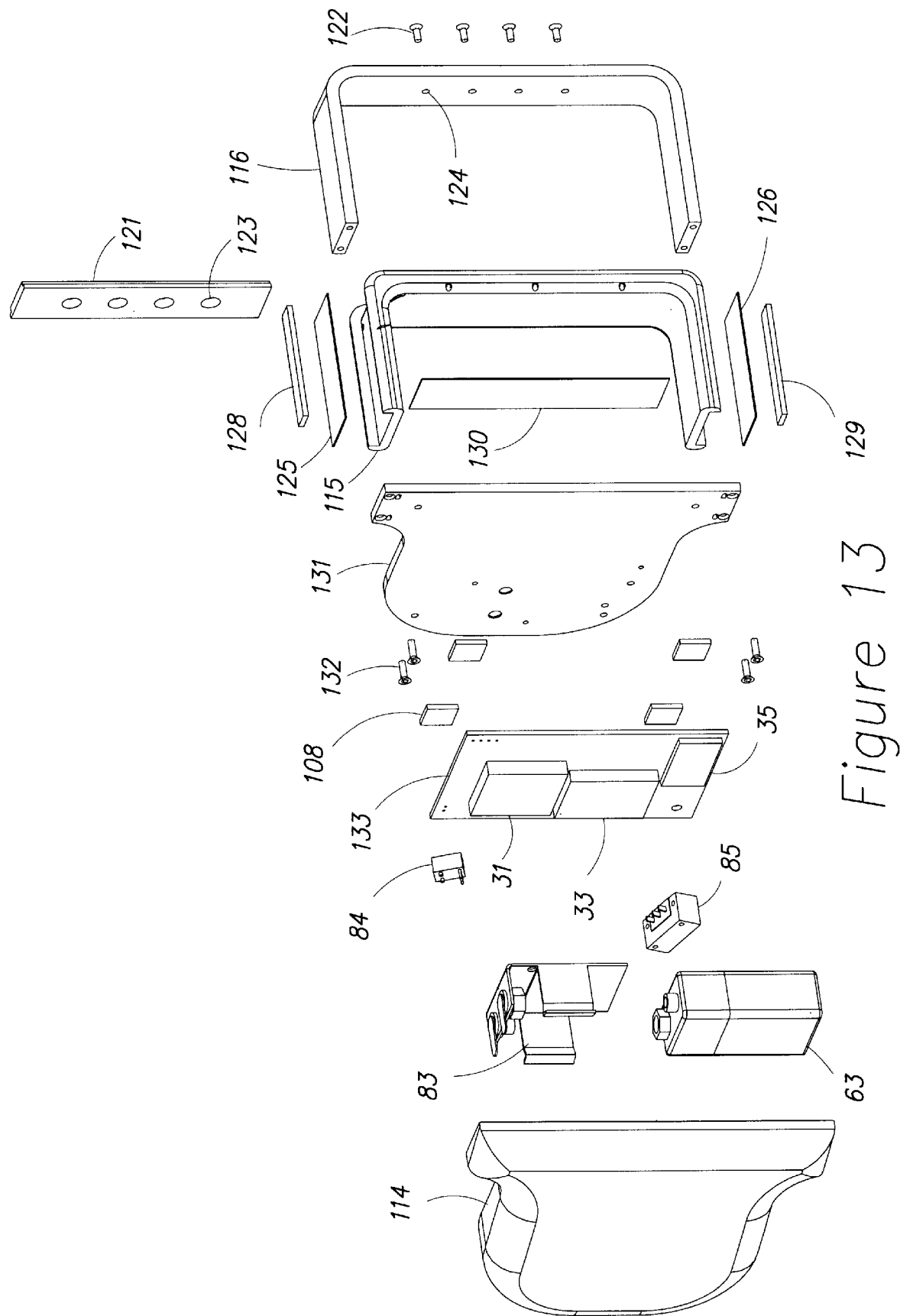
FIG. 13 demonstrates the exploded view of the sensory system and transmitter module of the second embodiment of the instrumented glove.

FIG. 12 shows another view of integrated sensory system 111 and transmitter circuitry 113 where transmitter circuitry cover 114 is removed to show the components of transmitter circuitry 113. FIG. 13 shows an exploded view of sensory system 111 and transmitter circuitry 113 of instrumented glove 110 where glove 29 is removed. Planer holding bracket 131 is connected to outer bracket 116 via four fasteners 132. The function of planar holding bracket 131 is two fold; it not only adds structural rigidity to outer bracket 116 but also creates a platform to hold a housing for transmitter circuitry 113. A printed circuit board 133, connected to planar holding bracket 131 by means of standard fasteners, holds all the components of transmitter circuitry 113 including RF transmitter module 33, micro-computer 31 and antenna 35. Four rubber pads 108 are located between printed circuit board 133 and Planer holding bracket 131. A 9-volt battery 63 is held by a battery holder 83 and powers all components of transmitter circuitry 113. A plug 84 is installed on planar holding bracket 131 which can be used to recharge battery 63. An off-on switch 85 is also installed on planar holding bracket 131 to disconnect power from the circuit. When the switch is in the off position the instrumented glove will not transmit any signal.

Cover bracket 114 can take many forms and shapes and designers can use all kinds of non-metallic materials for its construction. The exiting state of technology for mechanical design, material property and construction of the housing of the cordless telephone sets can be used for design of cover bracket 114. The designers must make sure that the generated heat from transmitter circuitry 113 can be taken out while no dust, dirt or water are allowed through cover bracket 114. A hole 184 (shown in FIG. 10 and FIG. 12) is for accessing recharge plug 84. Another hole on cover bracket 114 (not shown in any figure) is used to access the on-off switch 85.

Figure 14:
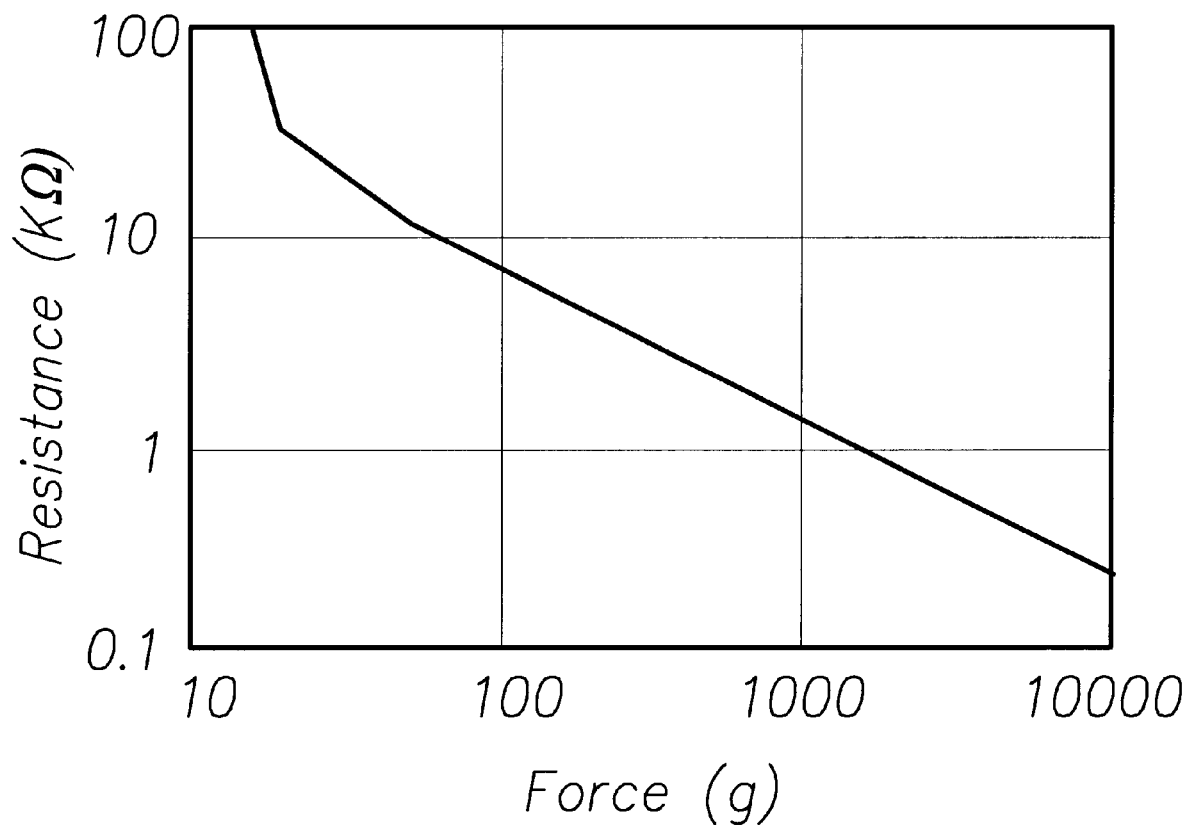
FIG. 14 demonstrates the characteristics of a force-sensing resistor.

There are many types of force sensors that can be installed in instrumented glove 110 that are known to and practicable in the present invention by one skilled in the art. In the first embodiment of the invention, we used Force Sensor Resistors to measure the forces. As their name implies, force-sensing resistors (FSR) use the electrical property of resistance to measure the force (or pressure) applied to a sensor. The force-sensing resistor is a polymer thick film (PTF) device, which exhibits a decrease in resistance with any increase in force applied to the active surface. The resistive material serves to make an electrical path between the two sets of conductors. Over a wide range of forces, it turns out that the more force is applied to the sensor, the smaller the resistance of the sensor will become and therefore the sensor conductivity is a function of force on the sensor. With a typical FSR sensor, a human finger applying a force from 0.1N to 10N will cause the sensor to change resistance continuously from above 1 MΩ to around 2 KΩ. The FSR force vs. resistance characteristic shown in FIG. 14 provides an overview of the FSR's typical response behavior. For interpretational convenience, the force vs. resistance data is plotted on a log/log format. At the low force end of the force-resistance characteristic, a switch-like response is evident. This threshold, or "break force", swings the resistance from greater than 1 MΩ to about 50Ω–100Ω (the beginning of the power-law). At the high force end of the dynamic range, the response deviates from the power-law behavior, and eventually saturates to a point where increases in force yield little or no decrease in resistance.

Figure 15:
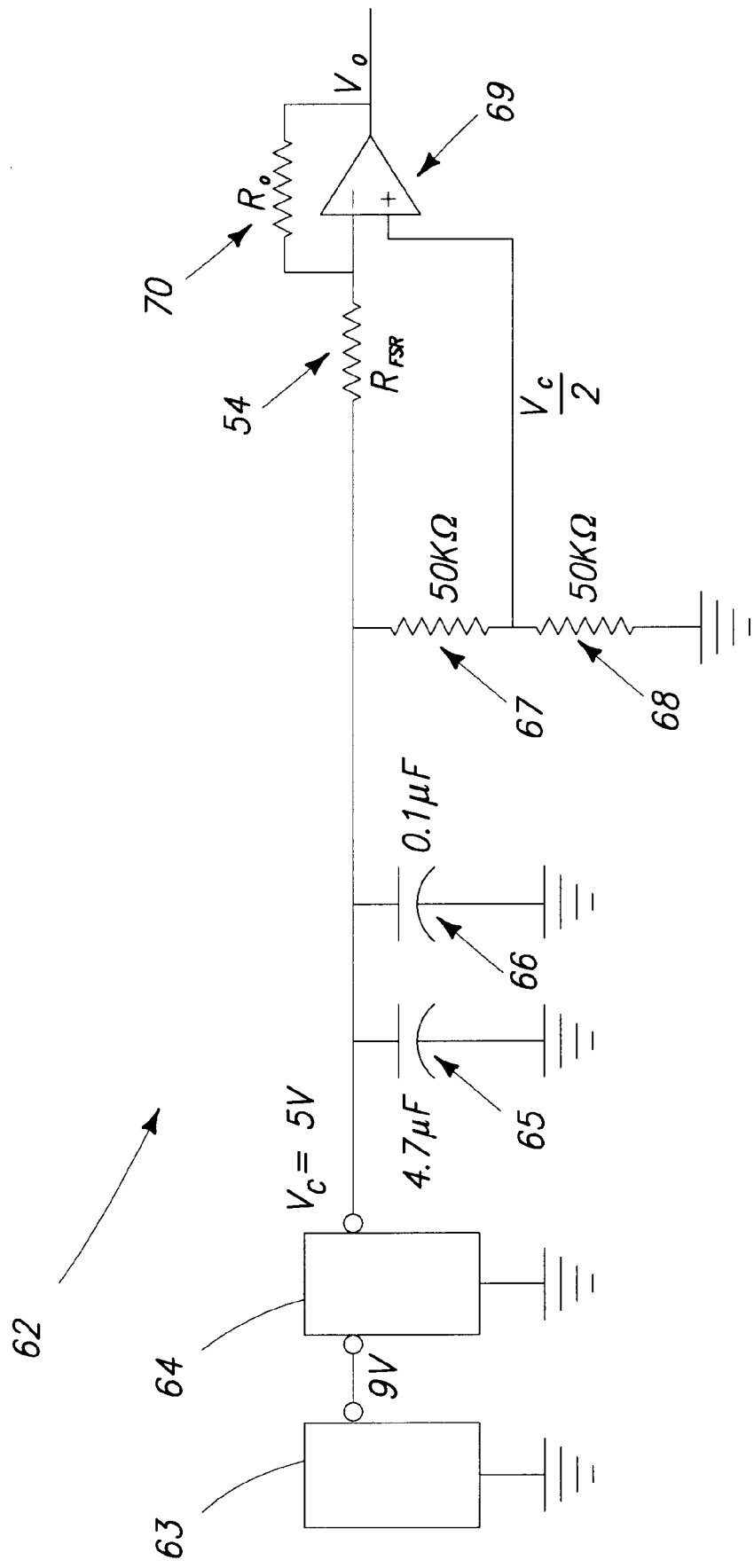
FIG. 15 demonstrates an electronic circuitry needed to utilize a force-sensing resistor.

FIG. 15 shows a conditioning circuitry 62 needed to utilize force-sensing resistor 54. Force-sensing resistor 54 represents symbolically all force sensing resistors (e.g. 87, 88, 125 and 126) used in sensory systems 11 and 111. As shown in FIG. 15, a 9-volt battery, 63, is used to provide power for transmitter circuitry 13 and force sensing resistor 54. A voltage regulator 64 is used to generate a five-volt source (shown by $V_C$ in FIG. 15). Two capacitors 65 and 66 are used to smooth the regulator output signal. Two 50 KΩ resistors 67 and 68 are used to create $V_C/2$. The use of operational amplifier 69 and feedback resistor 70 generates an output voltage $V_O$ such that:

$$V_O = \frac{V_C}{2}\left[1 - \frac{R_O}{R_{FSR}}\right] \qquad (1)$$

where $R_{FSR}$ and $R_O$ are the resistances of the force sensing resistor 54 and the feedback resistor 70 respectively. The output voltage, $V_O$, can then be read in micro computer 31 located in transmitter circuitry 13. We chose a 1 KΩ resistor for feedback resistor 70. When there is no force on the glove, $R_{FSR}$=100 KΩ and therefore $V_O=V_C/2$. When the sensor is pressed down fully, $R_{FSR}$=1 KΩ and $V_O$=0. This means the output voltage, $V_O$, decreases when force sensing resistor 54 is pressed. In this configuration the range of the output voltage is from 0 to $V_C/2$. There are other forms of circuits, proposed by manufacturers of force sensing resistors, which yield various output voltage ranges. In general, one must create a conditioning circuit that generates signal suitable to be read by the analogue to digital converter of the micro controller 31.

The present invention is not limited to force sensing resistors as force measuring elements in the instrumented glove. For example, while force sensing resistors were employed to measure the wearer force, one skilled in the art would know of other force measuring elements such as piezoelectric force sensing elements that can be used in the instrumented glove to measure the operator force. A piezoelectric force sensor produces electric charges when a force is applied to it. The generated electrical charges are then transformed to voltage via a charge amplifier for measurement. The fundamental difference between these devices and strain gage based force detection devices is that the electrical charges generated by the crystal decays rapidly after the application of force. This makes piezoelectric sensors unsuitable for the detection of static force. Kistler is an example of a company that has been manufacturing variety of piezoelectric sensors for many years.

Rather than generating contact signals representing the vertical operator contact force magnitude, in some applications one might be interested in a sensory system that generates contact signals, which are binary in nature; one signal when the vertical contact force is zero and another signal when the vertical contact force is not zero. In such cases the sensory system of the instrumented glove will be instrumented by a few momentary switches rather than a force sensor. When the operator pushes upwardly, a momentary switch is pressed and a set contact signals will be sent to transmitter circuitry representing a non-zero vertical upward contact force. When the operator is pushing downwardly against an object, another momentary switch is pressed and a different set of contact signals representing non-zero vertical downward force will be sent to transmitter circuitry. A momentary switch is defined here as a switch that shorts (or opens) a circuit as long as the switch is held pressed. When the momentary switch is not pressed, the embedded spring of the switch brings the switch back to its normally open position (or normally closed). Since these systems do not have force-measuring elements to produce contact signals proportional with the magnitude of the operator force, they yield lower production cost. Alternatively one can develop an instrumented glove to include arrays of force sensing elements on the glove to measure the wearer forces along various directions. Although only a few embodiments of the instrumented gloves are illustrated in the accompanying drawings and described in the foregoing detailed description, it is understood that the instrumented glove of this invention is not limited to the embodiments disclosed here.

Figure 16:
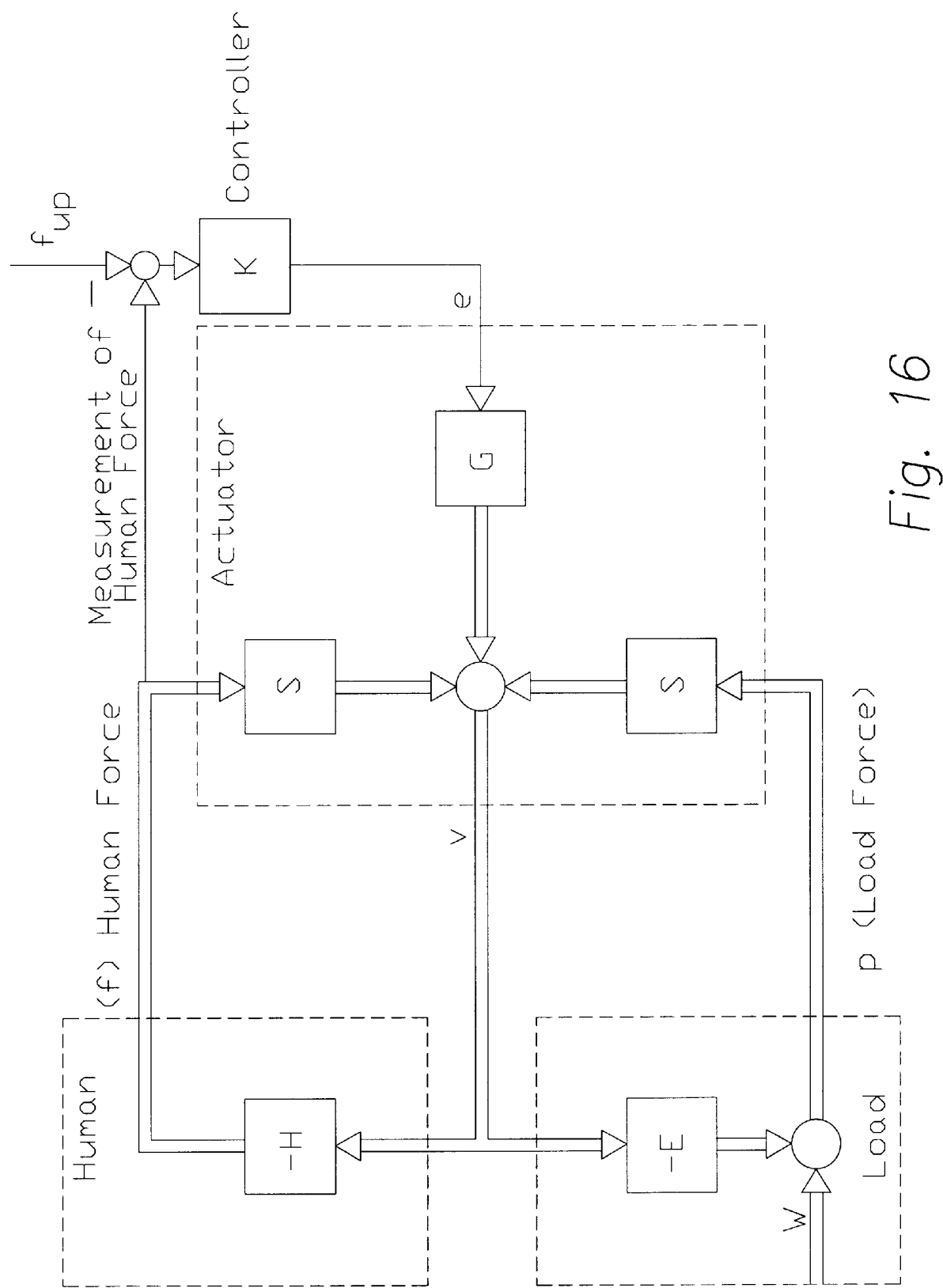
FIG. 16 demonstrates a schematic block diagram showing operator and load forces interacting with elements of the lift assist device to provide load movement.

The block diagram of FIG. 16 shows the basic control technique of the lift assist device 25 of FIG. 2. As described above, in a preferred embodiment, the force sensing element in the instrumented glove delivers a signal to controller 27 that is used to control actuator 28 and to apply an appropriate torque to pulley 18. If (e) is the input command to actuator 28, then, the linear velocity of the outermost point of the pulley 18 or the velocity of end-effector 22 (v) can be represented by:

$$v = Ge + Sf_R \qquad (2)$$

where (G) is the actuator transfer function which relates the input command to the actuator to the end-effector velocity and (S) is the actuator sensitivity transfer function which relates the line tensile force ($f_R$) to the end-effector velocity (v). A positive value for (v) means downward speed of the load. Also note that since the load is connected to the end-effector, both terminologies "load velocity" and "end-effector velocity" refer to v as derived by equation 2. If a closed loop velocity controller is designed for the actuator such that (S) is small, the actuator has only a small response to the line tensile force. A high-gain controller in the closed-loop velocity system results in a small (S) and consequently a small change in velocity, (v), in response to the line tensile force. Also note that non-back-driveable speed reducers (usually high transmission ratios) produce a small (S) for the system.

The line tensile force, ($f_R$), can be represented by equation 3:

$$f_R = f + p \quad (3)$$

where (f) is the operator-applied force either on load 47, on rope 26 or on end-effector 22 and force (p) is imposed by the load and the end-effector, referred to herein as the "load force" on the line. Positive values for (f) and (p) represent downward forces. Note that (p) is the force imposed on the line and is equal to the weight and inertia force of the load and end-effector taken together:

$$p = W - \frac{W}{g}\frac{d}{dt}v \quad (4)$$

where W is the weight of the end-effector and load taken together as a whole and $$\left(\frac{d}{dt}v\right)$$

is the end-effector and load acceleration. If the load does not have any acceleration or deceleration, then (p) is exactly equal to the weight of the end-effector and load, (W). Also note that inspection of FIG. 16 and equation 4 reveals that variable (E) in the block diagram of FIG. 16 presents $$\frac{W}{g}\frac{d}{dt}$$

in equation 4, therefore p=W−Ev.

The operator force, (f), is measured and passed to controller 27 that delivers the output signal (e). A positive number ($f_{up}$), in the computer, is subtracted from the measurement of the human force, (f). The role of ($f_{up}$) will be explained below. If the transfer function of the controller is represented by (K), then the output of the controller (e) is:

$$e = K(f - f_{up}) \quad (5)$$

Substituting for ($f_R$) and (e) from equations (3) and (5) into equation (2) results in the following equation for the end-effector velocity (v):

$$v = GK(f - f_{up}) + S(f + p) \quad (6)$$

Measuring an upward human force on the end-effector or on the load is only possible when the line is under tension caused by the weight of the end-effector. If the end-effector is light, then the full range of human upward forces may not be measured by the sensor in the instrumented glove. To overcome this problem, a positive number, ($f_{up}$), is introduced in equation (5). As equation (6) shows, in the absence of (f) and (p), ($f_{up}$) will cause the end-effector to move upwardly. Suppose the maximum downward force imposed by the operator is $f_{max}$. Then ($f_{up}$) is preferably set approximately at the half of $f_{max}$. Substituting for ($f_{up}$) in equation (6), equation (7) represents the load velocity:

$$v = GK\left(f - \frac{f_{max}}{2}\right) + S(f + p) \quad (7)$$

If the operator pushes downwardly such that f=$f_{max}$, then the maximum downward velocity of the end-effector or the load is:

$$v_{Down} = GK\left(\frac{f_{max}}{2}\right) + S(f_{max} + p) \quad (8)$$

If the operator does not push at all, then the maximum upward velocity of the end-effector or the load is:

$$v_{Up} = -GK\left(\frac{f_{max}}{2}\right) + S(p) \quad (9)$$

Therefore, by the introduction of ($f_{up}$) in equation (5), one does not have to worry about the measurement of the upward human force. If S=0, the upward and downward maximum speeds are identical in magnitude. However in the presence of non-zero S, for a given load and under equal conditions, the magnitude of the maximum upward speed is smaller than the magnitude of the maximum downward speed. This is very natural and intuitive for the operator.

Going back to equation (6), it can be observed that the more force an operator imposes on load or on line 26, the larger the velocity of the load and end-effector will be. Using the measurement of the operator force, the controller assigns the pulley speed properly to create enough mechanical strength to assist the operator in the lifting task. In this way, the end-effector follows the human arm motions in a "natural" way. In other words the pulley, the line, and the end-effector mimic the lifting/lowering movements of the human operator, and the operator is able to manipulate heavy objects more easily without the use of any intermediary device.

By inspection of equation 6, it can be observed that when the operator increases or decreases downward force on an object a corresponding increase or decrease occurs in downward speed of the object. Alternatively an increase or decrease in the object weight causes a decrease or increase, respectively, in the upward object speed for a given operator force on the object.

As FIG. 16 indicates, (K) may not be arbitrarily large. Rather, the choice of (K) must guarantee the closed-loop stability of the system shown in FIG. 16. The human force (f) is a function of human arm impedance (H), whereas the load force (p) is a function of load dynamics (E), i.e. the weight and inertial forces generated by the load. One can find many methods to design the controller transfer function (K). An article entitled "A Case Study on Dynamics of Haptic Devices: Human Induced Instability in Powered Hand Controllers," by Kazerooni and Snyder, published in AIAA Journal of Guidance, Control, and Dynamics, Vol. 18, No. 1, 1995, pp. 108–113, incorporated herein by reference, describes the conditions for the closed loop stability of the system. Practitioners are not confined to one choice of controller; a simple low pass filter as a controller, in many cases, is adequate to stabilize the system of FIG. 16. Some choices of linear or non-linear controllers may lead to a better overall performance (large force amplification and high speed of operation) in the presence of variation of human arm impedance (H) and load dynamics (E).

The choice of (K) also depends on the available computational power; elaborate control algorithms to stabilize the closed system of FIG. 16 while yielding a large force amplification with high speed of maneuvers might require a fast computer and a large memory. An article entitled "Human Extenders," by H. Kazerooni and J. Guo, published in ASME Journal of Dynamic Systems, Measurements, and Control, Vol. 115, No. 2(B), June 1993, pp. 281–289, incorporated herein by reference, describes stability of the closed loop system and a method of designing (K).

One can arrive at the theoretical values of (G) and (S) using standard modeling techniques. There are many experimental frequency domain and time domain methods for measuring (S) and (G), which yield superior results. We recommend the use of a frequency domain technique in identifying (G) and (S). For example the book titled "Feedback Control of Dynamic Systems," by G. Franklin, D. Powell, and A. Emami-Naeini, Addison Wesley, 1991, describes in detail the frequency-domain and time-domain methods for identifying various transfer functions.

Note that linear system theory was used here to model the dynamic behavior of the elements of the system. This allows me to disclose the system properties in their simplest and most commonly used form. Since most practitioners are familiar with linear system theory, they will be able to understand the underlying principles of this invention using mathematical tools of linear system theory (i.e. transfer functions). However, one can also use nonlinear models and follow the mathematical procedure described above to describe the system dynamic behavior.

Figure 17:
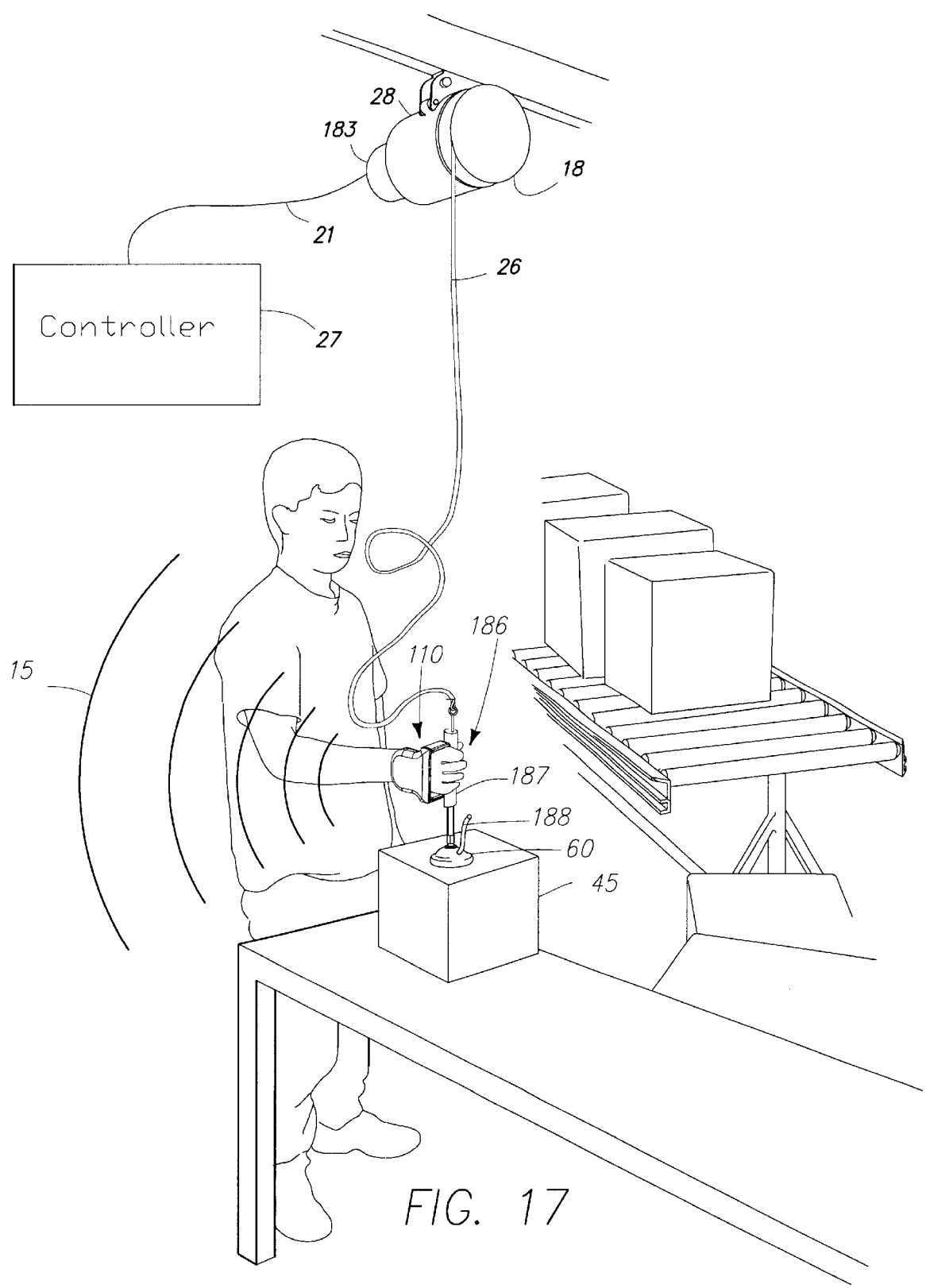
FIG. 17 demonstrates the problem of line slack.

A problem can occur in the device when the operator pushes downwardly on the load or on the end-efector but the load is prevented from moving downwardly. This situation can be explained with the help of the following example using a lift assist device 185 as shown in FIG. 17. Lift assist device 185 has an end-effector 186 that consists of a bar 187 and a suction cup 60 only. One end of bar 187 is connected to line 26 and the other end of bar 187 is connected to suction cup 60. A vacuum hose 188 is used to create vacuum in suction cup 60. The pneumatic circuitry associated with creating vacuum is not shown in FIG. 17. By grasping bar 187, operator 24 is able to lift or lower box 45 according to the method described above. If the operator pushes downwardly to ensure firm engagement of the suction cup 60 with box 45, actuator 28 unwinds line 26. This occurs because the controller, reacting to the downward human force, concludes incorrectly that the operator wants to lower the end-effector and sends a command signal to the actuator, which causes the actuator to unwind line 26. In some instances the unwound "slack" portion of line 26 can amount to a few feet. After the engagement of suction cup 60 with box 45, when the operator pushes onto the handle upwardly to lift box 45, the actuator and pulley must take up the slack in line 26 before box 45 is lifted. This impedes the operator since he has to wait while the actuator winds the slack in line 26. Moreover, the sudden change in the line tensile force from zero (i.e. when the line is slack) to a non-zero value (i.e. when the line is not slack), will jerk end-effector 186. This sudden jerk can cause box 45 to be dropped. In summary, the operator's motion during the lifting operation is impeded due to unnecessary slack in line 26; and the box may be dropped due to the sudden change in the line's condition from slack to tight. It is therefore important to ensure that the line 26 will never become slack.

The device of this invention, similar to the device of allowed U.S. patent application Ser. No. 09/443,278 has the capability to prevent the slack in the cable. When the operator pushes the end-effector or box downwardly to ensure tight engagement between suction cup 60 and box 45, the actuator does not unwind line 26. In other words, the device described here has the "intelligence" to recognize that the operator is simply pushing downwardly to engage the box with suction cup 60 and he does not intend to move his hand further downward. On the other hand, if the operator pushes against end-effector 186 downwardly when there is no box to resist the motion of the end-effector, the actuator of this invention will unwind line 26 to ensure that the downward operator motion is not impeded. The assist device described here is able to differentiate between these two cases; in the first case the actuator does not unwind line 26, while in the second case the actuator does unwind line 26.

In order to prevent the slack in line 26, one needs to detect the line tensile force ($f_R$). Then, with the knowledge of the line tensile force, one needs to adjust the pulley speed so rope is not unwound unnecessarily, and therefore slack is prevented in the line. In its simplest form, to prevent slack in the line, when ($f_R$) becomes zero the actuator and pulley must be stopped. In a more sophisticated form, to prevent slack in the line, smoothly, as the tensile force in the line, ($f_R$), approaches zero, the pulley rotational speed must be forced to approach zero and in the limit when a zero tensile force is registered in the controller for the line, the pulley rotational speed must be forced to zero. In other words the slack in the line is prevented by appropriately reducing the pulley speed to zero when tensile force is zero.

Previously, we stated that the pulley speed depends on the signal representing the operator force only. However for the device that will not create slack in the line, the pulley speed depends on the signal representing the line tensile force in addition to the signal representing the operator force on the end-effector or on the box. Two methods are preferred for detecting the rope tensile force. The first method involves the direct detection of the rope tensile force while the second method estimates the rope tensile force based on measurement of the power consumed by the actuator or the electric current used in actuator. Knowledge of line tensile force can then be used to force the actuator and pulley to have zero speed so slack is prevented in the line. Here we only describe one embodiment where tensile force in the cable has been measured for slack prevention. For other embodiments to detect line tensile force refer to allowed U.S. patent application Ser. No. 09/443,278.

Figure 18A:
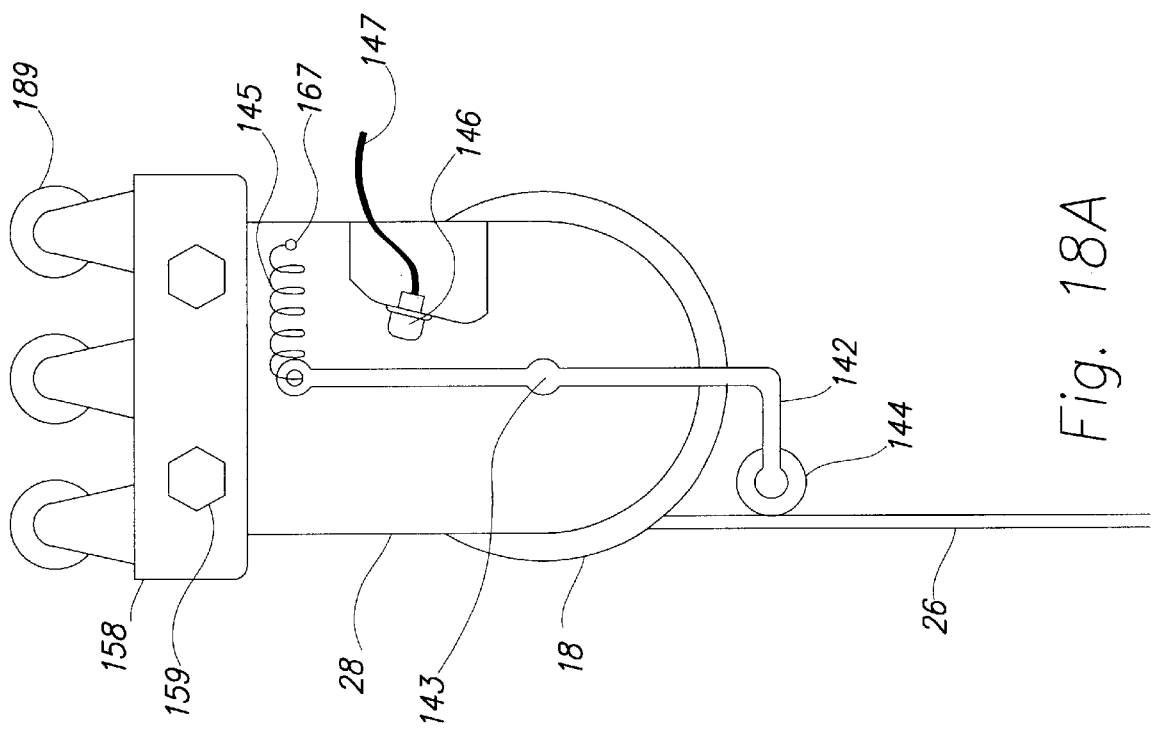
FIGS. 18A and 18B demonstrate one embodiment of an actuator that contains a mechanism and a switch to detect the line tensile force.
Figure 18B:
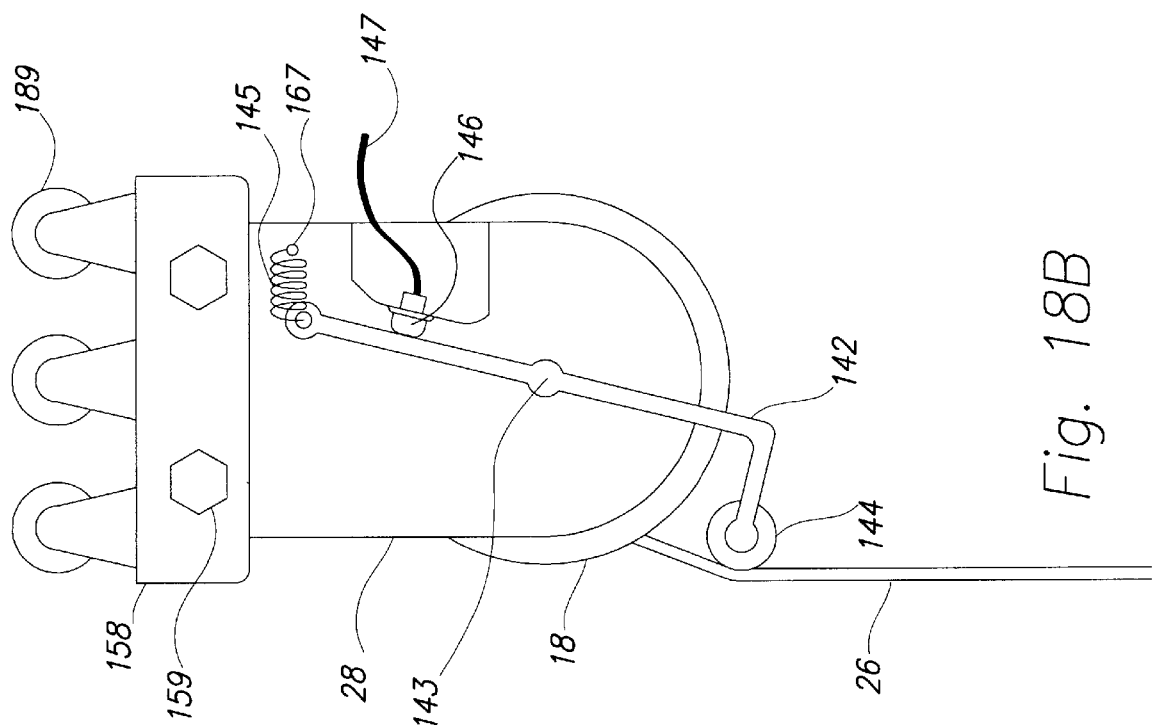

In the following embodiment of this invention, we are interested in a detection device that generates a binary signal; one signal when the line tensile force is zero and another signal when the line tensile force is not zero. These devices have low cost since they give limited information about the rope tensile force; they do not give any information on the size of the tensile force. FIG. 18A and FIG. 18B show a method where line tensile force, at the top of the device near actuator 28, is employed to generate a binary signal representing the line tensile force. Line 26 is wound on pulley 18, and actuator 28 is connected to trolley 158 via fasteners 159. Wheels 189 on trolley 158 allow for motion of the trolley on a rail or on an over head crane. Rotating bar 142 is free to rotate along point 143 on the actuator body and holds an idler pulley 144 on one arm and connects to a tensile spring 145 on its other arm. Tensile spring 145 is anchored to the actuator body at point 167. Idler pulley 144 is pushed against rope 26 via the force of spring 145. When the rope tensile force is not zero as shown in FIG. 18A, the rope tensile force overcomes the spring force and causes rotating bar 142 to be separated from momentary switch 146. When the rope tensile force is zero as shown in FIG. 18B, idler pulley 144 is pushed toward left by the force of tensile spring 145. This causes momentary switch 146 to be activated by rotating bar 142. Therefore, a signal is generated by the switch when the line tensile force is zero. Signal cable 147 carries the momentary switch output to the controller. Basically, the method described above uses the tensile force in the line to create a binary electric signal, representing the presence or absence of line tensile force for the controller; one signal when the line tensile force is non-zero and another signal when the line tensile force is zero. Instead of transforming the tensile force to rotational movement as shown in FIGS. 18A and FIG. 18B, one can transform the line tensile force into linear motion. This can be accomplished by installing idler pulley on a bar that has translational movement and is supported on a linear bearing. The idler pulley is in contact with line 26 and the tensile force in the line causes transnational movement for the bar. The movement of the bar, in return, causes a momentary switch to be activated. Of course can also use motion detector devices such optical encoder, revolvers, or a potentiometer to measure the motion of rotating bar 142 relative to the actuator body since the motion of rotating bar 142 is a function of the line tensile force. The larger the line tensile force is, the more rotating bar 142 turns in the anti-clockwise direction.

For detailed description of various methods in detection of the line tensile force refer to allowed U.S. patent application Ser. No. 09/443,278 where force sensors and switches have been installed on various points of the assist device. U.S. patent application Ser. No. 09/443,278 also describes methods of estimating line tensile force based on measurement of the current used in the electric actuator, since the current in the electric actuator is related to the tensile force in the line. For brevity we do not describe these methods here. All methods in U.S. patent application Ser. No. 09/443,278 to detect the line tensile force can be used in conjunction with the lift assist devices described here. Once the tensile force in the line is measured or estimated, the actuator speed must be modified according to the measured or estimated line tensile force. If the line tensile force is zero, then the input to the actuator should be modified to generate zero speed in the actuator so no extra line is unwounded. This method is described in details in allowed U.S. patent application Ser. No. 09/443,278.

Figure 19:
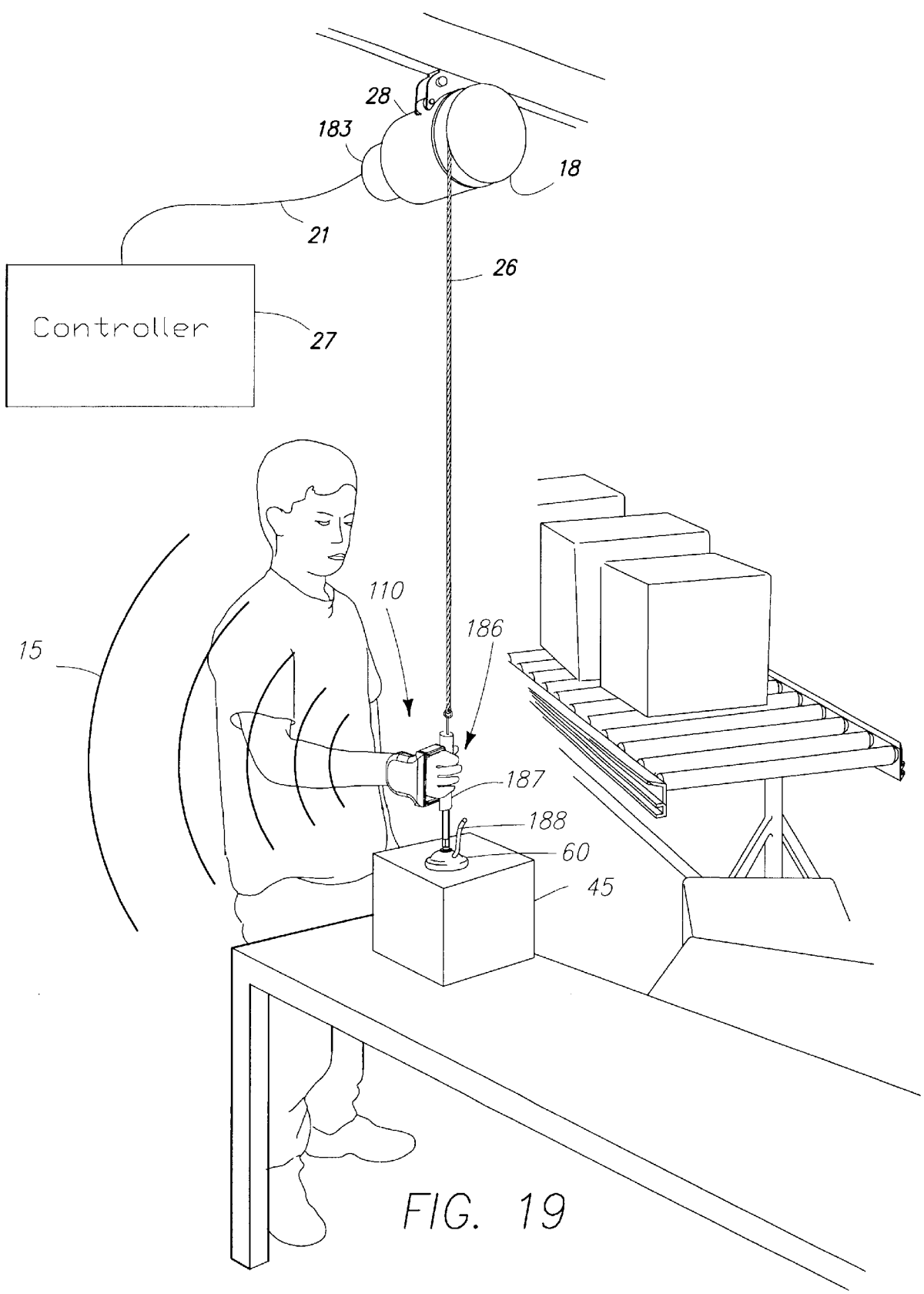
FIG. 19 illustrates one embodiment of a lift assist device that prevents slack in the line even when the operator is pushed downwardly while the load is constrained from moving downwardly.

FIG. 19 illustrates an embodiment of the invention that offers slack prevention according to allowed U.S. patent Ser. No. 09/443,278 and can be used for moving boxes from a conveyor belt. As can be seen in FIG. 19, line 26 does not become slack if the end-effector is pushed downwardly by the operator while the end-effector is constrained from moving downwardly. End-effector 186 which consists of handle 187 and suction cup 60 is connected to electric actuator 28 which is mounted on the ceiling or on an overhead crane. As actuator 28 rotates pulley 18, the pulley's rotation winds or unwinds line 26 and causes line 26 to lift or lower end-effector 186 and box 45. A suction cup 60 is used to engage box 45 to end-effector 186. Actuator 28 is controlled by electronic controller 27. The computer located in controller 27 receives two signals: one signal from instrumented glove 110 through radio waves 15 representing the operator force, and a second signal from a current sensor, representing electric current drawn by actuator 28. The signal representing the current drawn by actuator 28 is not shown in FIG. 27 since in this embodiment of the invention the available current sensor is in the power amplifier (located in controller 27) that powers electric actuator 28. The computer in controller 27 sets the speed that pulley 18 has to turn, based on two signals representing the operator force and the tensile force in line 26. Controller 27 powers actuator 28 via cable 21. The resulting motion of actuator 28 and pulley 18 is enough to either raise or lower line 26 the correct distance that creates enough mechanical strength to assist the operator in the lifting or lowering the task as required. If the operator's hand pushes upwardly on end-effector 186 or box 45, pulley 18 rotates so as to pull line 26 upwardly, lifting box 45. If the operator's hand pushes downwardly on the end-effector or on the box, the pulley rotates so as to move line 26 downwardly, lowering box 47. However, as shown in FIG. 17, the line does not become slack if the end-effector is pushed downwardly by the operator while the end-effector is constrained from moving downwardly.

The slack control methods described here were motivated based on an application of the device using the suction cups. Even if the lift device is not employed for use with the suction cups, the slack control described above is preferably implemented in the device. There are many situations when the operator can inadvertently push the load interface subsection onto various surrounding objects including the objects to be maneuvered. The downward residual force of the operator will cause slack in the line if the end-effector is prevented from moving downward. Therefore, it is important to prevent slack in the line at all times.

Figure 20:
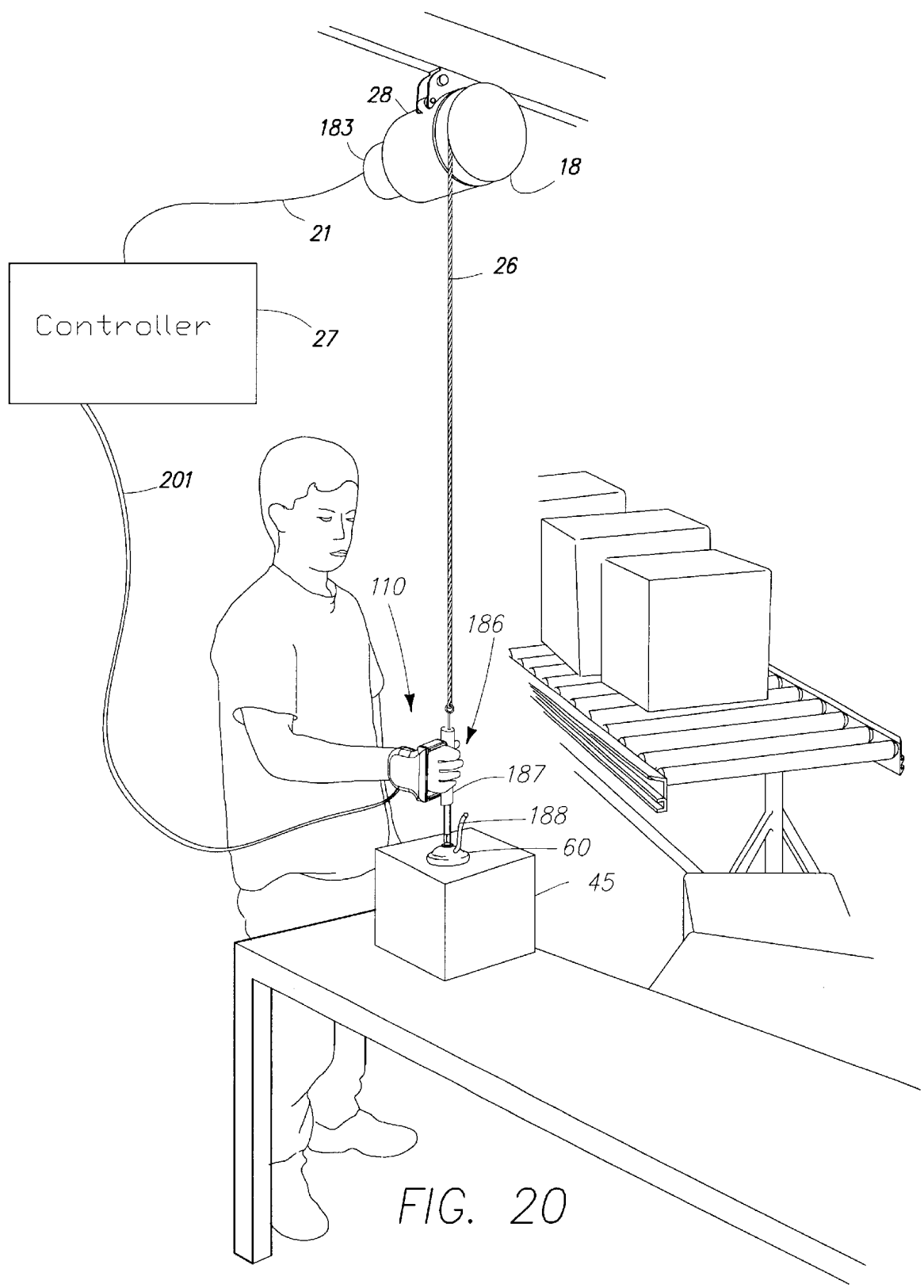
FIG. 20 illustrates another embodiment of the present invention where a signal cable is used to transmit a set of control signals.

Also other variations on the glove, which would be obvious to one skilled in the art, are possible. For example, in all embodiments described above, the control signals representing the human operator force are transmitted using 900 MHz radio frequency waves; other frequencies can equally be used for transmission of the control signals from transmitter circuitry. When hardware and costs justify, one could use Infrared (IR) signals for transmission of the control signals. Of course IR signals would be useful only when there is a direct line of sight between the transmitter and receiver. Infrared rays occupy that part of the electromagnetic spectrum with a frequency less than that of visible light and greater than that of most radio waves, although there is some overlap. In some special cases where wires and cables do not interfere with the operator motion, one could use a set of signal wires to transmit control signals that represent the human operator force. FIG. 20 shows a lift assist device 200 where a signal cable 201 is used to transmit control signals, representing the operator force, to controller 27.

Each and every patent, patent application and publication that is cited in the foregoing specification is herein incorporated by reference in its entirety.

Although particular embodiments of the invention are illustrated in the accompanying drawings and described in the foregoing detailed description, it is understood that the invention is not limited to the embodiments disclosed, but is intended to embrace any alternatives, equivalents, modifications and/or arrangements of elements falling within the scope of the invention as defined by the following claims. For example, while many of the embodiments described above use operator-applied force as the input to the system, the advantages that my system provides, particularly load weight sensitivity and slack prevention, can also benefit hoists that use valves or up-down switches to lift loads. Moreover, although specific equations have been set forth to describe system operation there are alternative ways to program the system to achieve specific performance objectives. The following claims are intended to cover all such modifications and alternatives.

What is claimed is:

1. A lift assist device for lifting and lowering at least one object, among other components, comprising:

an actuator arranged to turn a pulley;

a line wound on said pulley and connectable to said object;

an instrumented glove wearable by a human hand, wherein said instrumented glove detects a contact force imposed by said human hand on said object or a part of said lift assist device and generates a set of contact signals representing said contact force;

at least one transmitter circuitry capable of transmitting a set of control signals representing said contact signals to other locations; and a controller to receive and process said control signals and to generate command signals to control said actuator to cause said device to maneuver said object.

2. The lift assist device according to claim 1 wherein said transmitter circuitry transmits said control signals wirelessly via an electromagnetic field.

3. The lift assist device according to claim 1, wherein said transmitter circuitry transmits said control signals wirelessly in the form of RF waves.

4. The lift assist device according to claim 1 where said transmitter circuitry transmits said control signals to said controller via a signal cable.

5. The lift assist device according to claim 1, wherein said instrumented glove comprises at least one force-sensing element.

6. The lift assist device according to claim 1, wherein said instrumented glove comprises at least one strain gage based force-sensing element.

7. The lift assist device according to claim 1, wherein said instrumented glove further comprises at least one piezoelectric force-sensing element.

8. The lift assist device according to claim 1, wherein said instrumented glove further comprises at least one force-sensing resistor.

9. The lift assist device according to claim 1, wherein said instrumented glove comprises at least one switch to detect said contact force imposed by said human hand on said object or a part of said lift assist device.

10. The lift assist device according to claim 1, wherein said transmitter circuitry comprises a micro-controller, a transmitter module, and a transmitting antenna.

11. The lift assist device according to claim 10, wherein said micro-controller collects said contact signals from said instrumented glove and passes a set of information signals representing said contact signals to said transmitter module which transmits said control signals in the form of RF waves through said transmitting antenna.

12. The lift assist device according to claim 1, wherein said controller comprises a receiver circuitry, a computer, and a power amplifier.

13. The lift assist device according to claim 12, wherein said receiver circuitry comprises a receiver module and a receiving antenna, wherein said receiver module receives said control signals in the form of RF waves through said receiving antenna, and sends a set of data representing said control signals to said computer.

14. The lift assist device according to claim 12, wherein said computer delivers command signals to said power amplifier, which transfers power to said actuator.

15. The lift assist device according to claim 1, wherein said controller further includes a logic circuit comprising at least of an electromechanial relay and a solid state relay to start and stop said lift assist device.

16. The lift assist device according to claim 1, wherein said actuator which causes movement of said lift assist device includes an electric motor.

17. The lift assist device according to claim 1, wherein said actuator which causes movement of said lift assist device includes a clutch.

18. A lift assist device for lifting or lowering at least one object, including an actuator arranged to turn a pulley, a line wound on said pulley and connectable to said object, a controller controlling operation of said actuator, an instrumented glove wearable by a human hand, wherein said instrumented glove includes at least one force sensing element for detecting an operator-applied force on said lift assist device or said object, said lift assist device comprising:

a. the controller being responsive to a first signal representing operator-applied force and a second signal representing tensile force on said line; and b. the controller being programmed to turn said actuator as a function of said first and second signals.

19. The lift assist device of claim 18, wherein said controller prevents slack in said line if an operator pushes onto said object or said lift assist device downwardly while said object is constrained from moving downwardly.

20. The lift assist device of claim 18, wherein said pulley stops turning so that no line is paid out if an operator pushes onto said object or said line downwardly while said object is constrained from moving downwardly.

21. The device of claim 18, wherein said pulley stops turning and prevents said line from being paid out if an operator pushes onto said object or said lift assist device downwardly when tensile force on said line is zero.

22. The lift assist device of claim 18, wherein said actuator includes a brake arranged to prevent pulley rotation when said brake is engaged.

23. The lift assist device of claim 18, wherein said brake becomes engaged when no electric power is supplied to said actuator so that said pulley is prevented from rotating during an electric power failure.

24. The lift assist device of claim 18, wherein said instrumented glove includes a dead-man switch arranged so that when an operator contacts said object, or said lift assist device, said deadman switch is activated and a signal from said dead-man switch prevents a brake from engaging to prevent said pulley from rotating.

25. The lift assist device of claim 18, wherein said instrumented glove includes a dead-man switch that causes a signal to be sent to said controller causing said actuator to maintain its position when said operator removes his/her hand from said lift assist device or said object.

26. The lift assist device of claim 18, wherein the detector of the second signal includes a current sensor that measures electric current supplied to said actuator to estimate tensile force on said line.

27. The lift assist device of claim 18, wherein the detector of the second signal includes a force sensor arranged to generate a signal that represents tensile force on said line.

28. The lift assist device of claim 18, wherein the detector of said second signal is capable of generating a binary signal having one state when line tensile force is zero and a second state when line tensile force is not zero.

29. The device of claim 18, wherein the detector of said second signal is capable of generating a binary signal having one state when said object is constrained from moving downwardly and a second state when said object is not constrained from moving downwardly.

30. The device of claim 18, wherein the detector of said second signal includes a switch that can move to one position when said line is slack and can move to another position when said line is not slack.

31. The device of claim 18, wherein the detector of said second signal includes a force-sensing element arranged to generate a signal that represents the force imposed on said lift assist device by said object.

32. A method of operating a lift assist device, comprising the steps of:
 providing an instrumented glove wearable on a human operator's hand;
 pushing upwardly or downwardly by said human operator wearing said instrumented glove on a part of said lift assist device or an object being manipulated by said lift assist device;
 sensing the contact force imposed by said human operator's hand on said lift assist device or said object;
 transmitting a set of control signals representing said contact force from a transmitter circuitry;
 receiving said control signals through a receiver circuitry; and
 employing said control signals to control the speed and mechanical assistance of an actuator to move said lift assist device and said object being manipulated thereby.

33. The method according to claim 32, wherein said sensing step is accomplished by means of at least one force sensing element.

34. The method according to claim 32, wherein said sensing step is accomplished by means of at least one strain gage based force-sensing element.

35. The method according to claim 32, wherein said sensing step is accomplished by means of at least one piezoelectric force-sensing element.

36. The method according to claim 32, wherein said sensing step is accomplished by means of at least one force-sensing resistor.

37. The method according to claim 32, wherein said transmitting step is accomplished via an electromagnetic field.

38. The method according to claim 32, wherein said transmitting step is accomplished in by transmitting a set of RF waves which represent said control signals.

39. The method according to claim 32, wherein said transmitting step from said transmitter circuitry further comprises the steps of:
 collecting a set of contact signals in a micro-controller representing said contact force;
 sending a set of information signals representing said contact signals to a transmitter module; and
 radiating a set of RF waves representing said control signals through a transmitting antenna.

40. The method according to claim 32, wherein receiving step comprises:
 receiving a set of RF waves in a receiver module representing said control signals through a receiving antenna; and
 sending a set of data representing said RF waves to a computer.

41. The method according to claim 32, wherein controlling the speed and mechanical assistance of said actuator comprises;
 generating a set of command signals by a computer as a function of said control signals; and
 delivering said command signals from said computer to a power amplifier which transfers power to said actuator.

\* \* \* \* \*